US009690327B2

(12) United States Patent
Kielland

(10) Patent No.: US 9,690,327 B2
(45) Date of Patent: Jun. 27, 2017

(54) PORTABLE COMPUTER SUPPORT

(76) Inventor: Peter J Kielland, Ottawa (CA)

( * ) Notice: Subject to any disclaimer, the term of this patent is extended or adjusted under 35 U.S.C. 154(b) by 189 days.

(21) Appl. No.: 14/009,138

(22) PCT Filed: Apr. 5, 2012

(86) PCT No.: PCT/CA2012/000342
§ 371 (c)(1),
(2), (4) Date: Oct. 1, 2013

(87) PCT Pub. No.: WO2012/139198
PCT Pub. Date: Oct. 18, 2012

(65) Prior Publication Data
US 2014/0085814 A1 Mar. 27, 2014

(30) Foreign Application Priority Data

Apr. 11, 2011 (CA) ..................................... 2736642
May 17, 2011 (CA) ..................................... 2740909
Nov. 21, 2011 (CA) ..................................... 2759096

(51) Int. Cl.
*G06F 1/16* (2006.01)
*A45F 3/02* (2006.01)
(Continued)

(52) U.S. Cl.
CPC .............. *G06F 1/1633* (2013.01); *A45F 3/02* (2013.01); *A45F 3/14* (2013.01); *A45F 5/00* (2013.01); *F16M 11/041* (2013.01); *F16M 11/10* (2013.01); *F16M 11/105* (2013.01); *F16M 13/00* (2013.01); *F16M 13/005* (2013.01); *F16M 13/04* (2013.01);
(Continued)

(58) Field of Classification Search
CPC ................ A45F 2200/0525; A45F 3/14; A45F 2003/14; A45F 2003/142; G06F 1/163; G06F 1/1628; G06F 1/1633
USPC ..................................................... 361/679.29
See application file for complete search history.

(56) References Cited

U.S. PATENT DOCUMENTS 896,269 A * 8/1908 Birdwell ....................... 359/879
956,274 A * 4/1910 Birdwell ....................... 359/879
(Continued)

FOREIGN PATENT DOCUMENTS

FR 2867958 A1 9/2005
KR 20080032818 A 4/2008
KR 20100020295 A 2/2010

*Primary Examiner* — Michael Zarroli

(57) ABSTRACT

A support for a pad computer and the like includes a body support strap which may be placed around the neck or shoulders of a user, and a body propping unit that positions a computer outwardly from the torso of the user. The body support strap connects to the body propping member preferably at a location proximately aligned with the center of gravity of the combined mass of the computer and computer support when the body popping member is deployed in its stand-off position. In a preferred variant the body propping member is a U-shaped strut assembly with two arms joined by a bridge. The body support strap connects to the arms. The arms are hinged at the sides of the computer. The bridge may be swung from an in-use orientation spacing the computer outwardly from a user, to a parked position wherein the bridge lies adjacent to an opposite transverse edge of the computer in the plane of the computer.

20 Claims, 25 Drawing Sheets

(51) Int. Cl.

| | |
|---|---|
| ***A45F 3/14*** | (2006.01) |
| ***A45F 5/00*** | (2006.01) |
| ***F16M 11/04*** | (2006.01) |
| ***F16M 11/10*** | (2006.01) |
| ***F16M 13/00*** | (2006.01) |
| ***F16M 13/04*** | (2006.01) |

(52) U.S. Cl.
CPC . *A45F 2005/006* (2013.01); *A45F 2200/0525* (2013.01); *F16M 2200/024* (2013.01)

(56) References Cited

U.S. PATENT DOCUMENTS

| | | | | |
|---|---|---|---|---|
| 4,196,821 | A | 4/1980 | Teti | |
| 5,667,114 | A | 9/1997 | Bourque | |
| 5,762,250 | A | 6/1998 | Carlton et al. | |
| 5,887,777 | A | 3/1999 | Myles et al. | |
| 5,938,096 | A | 8/1999 | Sauer et al. | |
| 6,006,970 | A | 12/1999 | Piatt | |
| 6,349,864 | B1 | 2/2002 | Lee | |
| 6,381,127 | B1 | 4/2002 | Maddali et al. | |
| 6,655,540 | B2 | 12/2003 | Shimoda et al. | |
| 6,995,977 | B2 | 2/2006 | Yang | |
| 7,051,910 | B2 | 5/2006 | Sprague et al. | |
| 7,780,049 | B1 * | 8/2010 | Baranoski | 224/250 |
| 8,418,629 | B2 * | 4/2013 | Yu | 108/43 |
| 2004/0155859 | A1 | 8/2004 | Lee | |
| 2006/0037987 | A1 | 2/2006 | Lin | |
| 2007/0164987 | A1 * | 7/2007 | Graham | 345/156 |
| 2009/0159630 | A1 * | 6/2009 | Ko | 224/648 |
| 2009/0272779 | A1 * | 11/2009 | Vu | 224/677 |
| 2010/0025444 | A1 * | 2/2010 | Tipton et al. | 224/576 |
| 2010/0116860 | A1 | 5/2010 | Tello | |
| 2013/0038995 | A1 * | 2/2013 | Fang | 361/679.03 |
| 2013/0214022 | A1 * | 8/2013 | Harvey | 224/623 |

* cited by examiner

Figure 5A: Detail A

Figure 15A: Detail C

Figure 16A: Detail A

PORTABLE COMPUTER SUPPORT

FIELD OF THE INVENTION

The present invention is directed to a support system for a portable computer similar to the "Pad-Computer" type and the like including portable computers suited for use with the invention such as net books, Ebook readers (all referred to below as simply "P-Cs" or as a "computer" as the context requires) with the object of enabling a user to operate the computer with one or both hands while being seated or upright. Further features, amongst others, provide for the support to be positioned for storage or converted into a stand for tabletop operation.

BACKGROUND OF THE INVENTION

The advent of compact mobile computing devices that utilize a touch screen user interface has highlighted the need for an improved means of carrying them about while operating them. For example: in addition to their telephony functions, "Smart Phones" such as the Apple iPhone™ or the HTC Desire™ include a touch screen and Graphical User Interface. However the cell phone's inherently small size makes it difficult for a user to fully interact with the device's sophisticated software functions, particularly ones that require typing onto a virtual keyboard displayed on its tiny touch screen. It's quite difficult to actuate keys on these tiny "virtual keyboards" and virtually impossible to rapidly touch-type on them using both hands.

In order to operate such a Smart Phone, it must be held in one hand while being operated by the other hand and this ergonomic constraint limits its utility as a general-purpose mobile computer. To remediate the Smart Phone's lack of ergonomic efficiency, larger "Pad-Computers", also known as "tablet computers", have been introduced, examples of which are the Apple iPad™, the Motorola Xoom™ and the "Asus Eee Pad™. Such Pad-Computers (also referred to below as simply "P-Cs") have touch screens that are substantially larger than those of a smart phone. This greatly facilitates both data input and data visualization.

The Pad-Computer's relatively large touch screen is rectangular with a size and aspect ratio comparable to that of a typical printed page. To fully exploit its rectangular touch screen, a P-C typically has an internal accelerometer or gravity sensor that measures the touch screen's vertical orientation and automatically reorients its displayed data for correct viewing in either "portrait orientation" or "landscape orientation". This display feature enables different software applications to automatically display data in the most appropriate upright orientation for the task at hand. For example, users can rotate their P-C so its touch screen is vertically oriented (portrait mode), thereby enabling optimal display of "pages" when reading an "Ebook". If the user then wishes to edit a text document, they can rotate their PC screen through 90 degrees into horizontal orientation (landscape mode) and the Pad-Computer's word processing software will automatically display a large virtual keyboard along the bottom of the touch screen to facilitate the task.

The P-C's landscape-oriented virtual keyboard is typically large enough for the user to touch-type rapidly using both hands however in order to do so, the P-C must first be supported at an appropriate angle and position with respect to the use; typically, the P-C is supported on a horizontal surface such as a tabletop however the user's lap may also suffice as a support surface. Without such an external support surface and stand, the user is forced to hold their P-C with one hand while slowly typing with the other hand.

A further impediment to mobile use of the P-C is that there's a substantial risk of dropping it due to its smooth tablet-like shape which makes it difficult to grasp securely without obscuring the data display. To address these problems, a variety of tabletop computer stands (such as Yamada U.S. Pat. No. 5,607,135) can be used to provide the necessary tabletop support for a P-C so that it can be used more effectively. However, the use of such a stand will still force the user to sit at a desk while working and this defeats the purpose of using such a small computer that would otherwise be well-suited for mobile use.

To enable true mobility during two-handed operation and/or hands-free viewing of a P-C's touch screen, it could be "worn" by the user as they walk about using a harness that suspends the P-C at an optimal location and orientation in front of their abdomen. A variety of prior art harness devices are somewhat adaptable to this mobile usage mode: e.g. Morde (U.S. Pat. No. 1,542,163) provides a hands free platform that could emulate the function of a tabletop as described above and thereby facilitate optimal mobile use of a Pad-Computer.

Similar harnessed platform configurations are disclosed by Bourque (U.S. Pat. No. 5,667,114), Saner (U.S. Pat. No. 5,938,096, Lee (U.S. Pat. No. 6,349,864), Maddali (U.S. Pat. No. 6,381,127) and Baranoski (U.S. Pat. No. 7,780, 049). In particular Lee (U.S. Pat. No. 6,349,864) provides a body hanging member in the form of a neck strap and a hinged U-shaped propping unit for separating the portable computer from the user's body in which this strap may be connected either to the computer or to the arms of the propping unit. However the propping unit, amongst other things cannot be swung completely past both transverse edges of the computer, lacks a facility for supporting the computer at multiple discrete orientations and does not provide for the hanging strap to be connected to allow the computer to assume both near-balanced and pendulous orientations.

It is the goal of the present invention to provide a wearable P-C carrier that eliminates many of the above mentioned drawbacks.

The invention in its general form will first be described, and then its implementation in terms of specific embodiments will be detailed with reference to the drawings following hereafter. These embodiments are intended to demonstrate the principle of the invention, and the manner of its implementation. The invention in its broadest and more specific forms will then be further described, and defined, in each of the individual claims which conclude this Specification.

SUMMARY OF THE INVENTION

This invention addresses a support for a portable computer, and preferably a portable computer in "pad" format also known as a "tablet computer", to be operated by a user which comprises a body support member by which the weight of the computer may be carried by the upper body of a user and a body propping member for positioning the computer outwardly from the torso of a user. A pad computer herein includes Ebook readers and cell phone and other microelectronic devices which have a generally planar form factor and which provide a display on one of two face surfaces with or without a cover being present.

In one version of the invention the body propping member is a strut assembly having two arms which can deploy extendable ends from storage positions along the side edges of the computer for engagement with the torso of a user. The body support member in the form of straps, cords or the like (hereafter “straps”) connects to these two respective arms to carry the weight of a computer. In particular the body support member carries the weight of the computer through coupling points where the support connection is made to these two arms.

For purposes of establishing a balanced equilibrium the connection of the body support member to the respective coupling points is preferably made along a line that will pass through or near the combined center of gravity of the computer and body propping member together when a computer is being carried by the support assembly. In cases where the body propping member can occupy respectively a deployed position outwardly from the computer and a parked position closer to the computer, this condition of balanced equilibrium is desired when the propping member is deployed. When the propping member is parked, it is preferable for the computer and its support assembly to assume a pendulous orientation. It is therefore desirable for the coupling points to be established accordingly.

Positioning the coupling points in approximate alignment with the center of mass of the computer+body propping member combination serves to minimize the torque developed by the weight of the computer and propping member combination in interacting with the body support member and the contact of the strut assembly with the body torso when the propping member is deployed. This alignment need not be perfect as the body contacting portion of the body propping member can provide a counter-acting torque through its frictional engagement with the body of the user. It is sufficient to reduce this torque to a level where this frictional engagement can be maintained with a minimal or acceptable tendency for the body propping member to slip in its contact with the torso of a user.

To enhance this objective, the body contacting surface of the body propping member can be provided with an anti-slip finish. This may be in the form of a rubber bumper for frictionally engaging the torso of the user. Preferably this contacting surface is curved for more intimate or more comfortable engagement with the torso of a user.

As one variant of the invention a propping support for a computer can be provided by two free arms carried by fixtures formed on the lateral side edges of a computer or connected to the outer ends of a backing plate for a computer. The backing plate may carry such free arms through edge-mounted tubes, tracks or linear guides located on the lateral sides of the computer or backing plate which allow the arms to be slid for storage alongside such lateral sides. Alternately the free arms may be rotationally coupled to the computer or backing plate. Advantageously, the ability of rotational arms to move out of planar alignment with the computer exposes access to computer ports along the edge of the computer.

A backing plate when present can carry the computer connections that allow the two movable arms to be connected to a computer and indirectly the coupling points where the body support member connects to the support of the invention.

According to another variant the two arms are joined by a connecting member or “bridge” positioned at the respective first, extendable, ends of each arm, outwardly from the location of the computer or backing plate to provide a unitary U-shaped body propping member or “U-shaped strut assembly” or “U-shaped swing arms”. The other, second, ends of each arm are spaced apart for connection to opposite sides of a portable computer or backing plate when positioned there between. This forms a U-shaped support assembly that allows a computer to be supported forward of the central torso of the user. In this variant the bridge may be deployed outwardly from the computer either by a sliding action or by rotation.

The bridge may have a concavely curved contacting surface to provide a more intimate or more comfortable engagement with the torso of a user. The inside surface of this curve can carry the anti-slip finish.

The corner connections between the arms and the bridge may be resilient so that, without the computer present the arms are angled inwardly as proceeding towards their second ends, but can be resiliently spread apart to receive and grasp a computer there between. Additionally, the arms may be curved outwardly where the arms meet the bridge to improve such resilience and to provide additional protection to the computer against being dropped, beyond that provided by having the U-shaped strut assembly present around a portion of its perimeter.

In the case of the U-shaped strut assembly the connection to the computer is preferably effected through pivoting connectors that allow the arms to rotate with respect to the body of the computer, when present. This permits the U-shaped strut assembly to be swung from an operating configuration wherein the bridge of the strut assembly is outwardly spaced from the computer on the user side of the computer, to a reverse location where the bridge is parked close to or adjacent to the edge of the computer which is remote from the body of a user. This latter configuration, particularly when the bridge is co-planar with the computer, is useful for purposes of storage.

According to a preferred feature of the U-shaped strut assembly, when this assembly is connected to a computer the bridge is located at a position with respect to the pivoting connectors whereby the bridge is closer to the computer when in the storage position than when in the operating position. In this storage position, the computer and support assembly should tend to form a pendulous orientation when suspended from the body support member.

Correspondingly, when this assembly is, connected to a computer with, as indicated earlier, the coupling points for the body support member to the respective arms being located along a line that will pass through or near the combined center of gravity of the computer plus the support assembly, this combination will tend to assume a more nearly balanced equilibrium. This will make the computer, or supported table when employed, more stable when in use.

The pivoting connectors may also permit the arms, and bridge when present, to be positioned at preferred orientations intermediate the two co-planar limits. Conveniently, the pivoting connectors may have détentes, stops or other locking means that permit the arms and/or bridge to be disengageably fixed at least some of these preferred locations. For example, locking may be effected through use of a frictional or clamping connection that, when engaged, will eliminate the tendency of the arms or strut assembly to rotate with respect to the computer. This will permit a wide range of locked orientations to be established. A preferred locking mechanism is a key and keyway, particularly where the keyway is of a cruciform configuration. This will provide in the latter case a series of locked orientations at 90° from each other.

These locking means permit the arms or strut assembly to be positioned and detachably locked in discreet orientations with respect to the computer. Fixing the arms or bridge at an intermediate location can be used to prop the computer on a support surface, allowing it to be inclined at an angle which is convenient for viewing and/or operation by a user.

In use, the independent arms or U-shaped strut assembly may be positioned at 180° from the parked location, but adoption of a precise transfer angle of 180° is not essential. In use, the computer can be positioned out of co-planar alignment with the arms or U-shaped swing arm as by using a frictional or spline connector. However, by adjusting the extension of the body support member as described further below, equivalent adjustments to the orientation of the computer when in use can be obtained.

The advantages of positioning the coupling points for the body support member with respect to the center of gravity of the computer and U-shaped support assembly have previously been addressed. The positioning of these coupling points with respect to the pivoting connection with the computer will now be addressed.

These coupling points can generally be located at any position corresponding to the lateral edges of a computer to be held in the computer support assembly, preferably inboard of the transverse upper and lower ends or margins of a computer, so long as there is sufficient frictional engagement of the propping member with the torso of a user. Such coupling points are, in the case of a separate arms or a U-shaped strut assembly, preferably positioned at locations on each arm which, with respect to either the pivoting or sliding computer connectors, are at or remote from the bridge member. For this purpose; the arms may be provided with stub extensions or end portions that extend past the computer connectors on the side of such connections opposite to the extendable ends. Having the coupling points inboard of the transverse upper and lower ends or margins of a computer improves the balance when the body propping member is deployed for use.

According to one variant such stub extensions or end portions are in the form of aligned extensions to the arms which extend past the computer connections positioned between the arms and the computer. These extensions allow the ends of the body support member to be each connected to an arm on the side of the computer connection that is remote from the bridge or body-contacting portions of the arms. Connecting the body support member to the these stub extensions at such a location still allows the carrying force of the neck strap to be located near the line which provides a balance point for the computer+propping member combination when the computer is being used in its stand-off position. At the same time, being connected at this location when the arms or the U-shaped swing arm are rotated to a parked location automatically transfers the body support member coupling points to a location closer to the transverse edge of the computer. This provides a more stable, pendulous, hanging orientation when the computer is suspended beside the torso of a user, hung from the body support member.

The stub extensions as described are in linear alignment with the arms in one variant. Extensions may also be provided to the arms in either the upwardly or outwardly directions to adjust the location of the coupling points between the body support member and the arms. Hinged upwardly extending extensions may align with the body support member/strapping, functioning equivalently to being a portion of such strapping. Hinged or otherwise deployable outwardly extending extensions can function to spread the coupling points out laterally, improving manual access to the computer. Any extensions of this type may also be considered as forming part of the arms.

The stub extensions may also provide advantageous support in orienting a computer when it is being propped on a desk surface as described further below. The engagement of arms or the U-shaped strut assembly to a computer may be provided through insertion of a fastener into a hole in the side of a computer whereby the respective arms are attached to the computer on both sides. This is a preferred arrangement where a computer is specifically manufactured in anticipation of receiving a computer support according to the invention. Alternately, this engagement may be effected through clamps that embrace the upper and lower faces of a computer along the respective sides where the connection is effected. In this case, the invention may be applied to a standard computer which has not been manufactured in anticipation of use with a computer support as described.

In the latter case and even optionally as reinforcement for a specifically manufactured computer, a backing plate may extend between and join-up with the respective connectors. When present, such a backing plate is dimensioned and shaped to underlie the bottom face surface of the computer. When employed this backing plate can carry respective side edge clamps for engaging with the computer. Preferably, soft contacting, e.g. rubber, pads are provided between these edge clamps and the computer. The arms may be connected to the backing plate at the outer ends of this backing plate with the other parts of the backing plate being connected to a computer and thereby providing the overall computer connection.

To provide for fixing the arms or U-shaped swing arm at multiple angular orientations with respect to a computer, the pivoting connection between the arms and the computer may be provided with a combination key and keyway connector combination or fitting.

The arms in the case of a U-shaped strut assembly are preferably of a material and shaped and dimensioned to be inwardly spring biased for closing on the backing plate or computer when these items are positioned between the arms. The separations between the respective arms and the lateral sides of the backing plate or computer may be spaced apart by a keyway connector assembly located between these parts. Conveniently, the presence of such a connector assembly may provide a "graspable gap" or clearance of approximately one centimeter between the arms and the lateral edges of a computer located between the arms. This permits the computer to swing past the fingers of a user holding the arms apart while the computer changes its orientation. This also provides a graspable gap for picking up the computer by one of the arms. The elastic bias of the arms to close together should preferably be sufficiently strong to maintain engagement of the keyway connections during such handling.

When a backing plate is employed this backing plate can either carry a pair of keyways for engaging with complimentary keys carried on the ends of the arms; or the backing plate can carry the keys which engage with a pair of key ways fixed preferably near, but short of, the ends of the arms which provide the coupling points. The inward biasing of the arms in the case where a bridge is present will serve to automatically engage keys into their respective key ways when they are in rotational alignment. The arms can be elastically spread apart to disengage the keys from their keyways and allow rotation of the computer within the U-shaped strut assembly. Without the bridge, resilient spring means can be included within the individual computer connections to achieve the same effect.

While multiple angular orientations may be provided through use of a keyway coupling, the keyway may preferably be cruciform in shape to provide four fixed orientations for the arms. In two of these orientations the arms, and bridge when present, are co-planar with the computer; and in two further cases the arms are perpendicular to the computer. The backing plate or computer can carry the cruciform with the keyway being present on the arms; or the cruciform can, more preferably, be carried on the arms engaging with the keyway. In the latter case, with a backing plate present, the keys can be supported by the backing plate and positioned adjacent to the lateral edge of the computer.

In an alternate version which relies on the computer itself to provide the function of the backing plate, the backing plate can be omitted. This is appropriate to a case where the computer is pre-manufactured to be coupled to the support of the invention. In this case lateral edges of the computer can serve as a key for engaging a keyway carried on the arms of the swing arm. Alternately, in this integrated version, the computer edges can be manufactured with recesses which provide the keyways or be provided with protruding keys.

In either case in an integrated version, a mere hole on the side edge of the computer can be used to support the rotational connection between the swing arms and the computer. This hole can be designed to receive a threaded fastener or a bayonet-type faster (preferred).

The arms not only serve as a standoff for propping the computer outwardly from the torso of a user, but can also double as a prop for providing multiple support positions for a computer on a desktop: shallow-angle landscape orientation, steep-angle landscape orientation, and upright, steep-angle portrait orientation.

The stub extensions when oriented at 90° from the plane of the computer allow a shallow propping of the computer on a desk surface for typing. The longer length of the arms when similarly oriented provides upright propping of the computer for viewing. Rotated into portrait mode, one of the outward extending arms can also serve as a prop for an upright display in portrait mode. However an improved portrait presentation can be obtained when an accessory foot plate is attached to one of the arms when the swing arm is parked in its storage location.

An accessory foot plate that engages an underlying arm when in its co-planar, parked, positioned increases the stability for supporting the computer in a portrait orientation. The footplate has a horizontally aligned slot for receiving and engaging an arm which is preferably in the form of a flat, rigid, strap. When the accessory foot plate is used to hold the computer in portrait view, with the arm in the plane of the computer, the footplate engages the arm centrally for balanced support of the computer.

The bridge on the U-shaped support assembly can be used, particularly when it is curved slightly outwardly at its corners where the arms meet the bridge, to provide a 2 point support for wall hanging.

In conjunction with the above features, the body support member may also be adjustable to permit a user to raise or lower the vertical locations of the two ends of the strap. The body hanging support may be provided in two versions, e.g. as a neck strap and in the form of a back strap.

According to one variant, the neck strap may be composed of two pieces of linear material, such as nylon parachute-quality cord or the like, (hereafter all referred to as "straps"), that pass each other when crossing behind the neck of the user to respectively terminate on the front side of the torso of a user. In this version one end of each strap portion is connected to support the computer at a coupling point. The respective lengths of the portions of this composite strap may then be dimensioned to pass around the back of the neck of a user with their other ends terminating at special end connectors located proximate to the chest of the user.

These connectors are preferably compression-actuated clamps which effect, through a compression-actuated button, a sliding/locking engagement between the respective ends of one of the composite straps and an adjacent mid-portion of the other strap. Adjusting the positioning of the end connectors will adjust the vertical locations of the two computer-supporting ends of the strap portions, provided the strap portions are allowed to slide as they pass around the back of the neck of a user.

For the convenience of the user, the multiple strap portions may be contained within a protective sleeve at least for the sections along their lengths where such respective portions pass around the back of the neck of the user. The use of such a sleeve isolates any sliding action by the strap portions from rubbing against the clothing or body of a wearer.

When passing around the neck of the user, the neck strap portions are contained in a sleeve. Preferably the sleeve is bifurcated to provide two separate channels within which the neck strap portions may independently slide. The inside surface of the channels can be of a low sliding resistance material.

To further stabilize the computer support, particularly when the user is especially active as in walking rapidly or turning suddenly, a quick-attachment waist strap may be employed. This waist strap, preferably of a elastically extensible material, is placed around the back of a user at the level of his waist with its two ends detachably fastened as by hooking or otherwise to the outer corners of the U-shaped strut assembly where the arms join the bridge. This anchors the bridge in place against the torso of a user providing the desired increased stability.

The computer support system can conveniently be integrated with a storage bag for the computer and support assembly. The bag has a corner notch along its upper folding edge where a flap folds over to effect closure. This allows access for the neck strap to extend into the bag where it is connected to and continues to support the computer when placed in the storage bag.

When the computer is in use with the body propping member deployed, the bag may remain tethered to the arms by short flexible tethers which are able to hang on the arms at the extendable ends of the arms, or slide between positions either adjacent to the extendable ends or adjacent to the pivot point on the computer connection.

A backing plate may support a turntable that can carry a smaller dimensioned computer, e.g. an iPhone, micro-computer or similar device. Such a smaller computer can be fastened to the backing plate through grasping fingers that extend outwardly from the backing plate and curl around the edges of the smaller computer to hold it in place. Alternately, for a permanent arrangement, such a computer may be adhesively attached to the backing plate.

A further backing plate based version of the computer support of the invention is particularly adapted for use with smaller microcomputers, iPhone-type devices, Ebook readers and cases where the user wishes to use the support in a reclining condition. The electronic device to be supported is carried by the backing plate in the manner as previously described although the connection to the backing plate need not be, though permissively may be, a pivotal connection.

This variant provides two optionally free arms connected by a backing plate that spans between the two free arms to collectively serve as a body propping member. The backing plate carries these free arms through edge-mounted tubes or the like located on the lateral sides of the backing plate which serve as tracks or guides and allow the arms to be slid for storage alongside such lateral sides.

The body support member in the form of either a neck, strap or back strap engages with the outer side edges of the backing plate at coupling points along such edges. In the case of the smaller and lighter electronic devices, location of this coupling point with respect to the center of mass of such devices and the body propping member is of less importance, particularly when the lengths of the side edges are not substantial.

A further feature of the invention may be effected with a computer or backing plate which is unsatisfactorily narrow in transverse dimension. This may cause some inconvenience in manually accessing the instrument being supported and may reduce the rotational stability of the support when a wearer turns suddenly about a vertical axis. Both of these conditions can be ameliorated by displacing the coupling point between the body support member and the computer or backing plate when present laterally outward from the sides of the computer or backing plate.

This arrangement can be accomplished by providing behind the computer, adjacent to or as part of the backing plate when present a linear spreader member with strap coupling points such as notches at its outer ends. The function of the strap coupling points provided by the spreader is to effect a routing of the body support member laterally outwardly from the sides of the computer or backing plate to provide the improved access and rotational stability.

As this spreader member when of linear proportions is prospectively longer than the widths of either the backing plate or computer, when it is desired to use such a spreader in conjunction with a storage bag, the spreader may be collapsible in its length as by folding, telescopic sliding disassembly into two portions to reduce its dimension to the point where it will fit in the storage bag.

A similar function may be provided by employing outwardly extendable terminal portions to the arms which carry the coupling points. These terminal portions may be hinged to the arms so that their ends may be deployed outwardly, and temporarily fixed so as to extend laterally from a computer or backing plate in a manner similar to the spreader.

According to a further configuration of the invention which takes advantage of the gravity-sensing capacity of a pad computer, a neck strap is employed as the body support member and the computer is worn with the bridge of the U-shaped strut assembly located in its parked position. A user places the neck strap over one shoulder with the loop passing around their head, other shoulder and arm. This places the computer beneath one arm where it can be easily shifted to the backside of the user's hip or to the front portion of their torso, similarly to the wearing of a lady's purse.

In this mode because the U-shaped strut assembly is maintained in its parked position, this causes the computer to hang spontaneously in a pendulous orientation. In this position, the computer may carry a display, in upright orientation, which serves as a billboard for advertising. For quick use, without deploying the bridge to its extended position, the computer may be placed against the forward torso of the user optionally on one hip partially towards the armpit under which the computer has been stored. The body support member remains coupled to the computer in the usual manner and the computer maintains its bridge in the parked configuration. With the bridge positioned against a user's body the computer is shifted from the pendulous orientation to a horizontal orientation by rotating the computer and simultaneously causing the display to re-orient by 180 degrees for normal viewing and use.

Because the bridge carries a frictional contact surface, it is not likely to be displaced particularly when partially held by one hand of the user. The body support members, and their adjustability features, allow the computer to be used for short notations. Rotation of the computer into portrait mode is also possible by extending one of the 2 neck strap portions to a greater length than the other.

The ability of the computer to be used in this mode, either in landscape or portrait presentation, is supported by the computer being of the type wherein the computer image automatically rotates in accordance with an orientation sensor to make the image up-right for a user.

In another variant, the computer support is a "sleeve" type case comprised of a rigid or semi-rigid backing plate that carries periphery gripping means to form a protective box-like enclosure around the sides of a tablet computer (PC). A top aperture in the sleeve case is provided through which a PC can be inserted or removed and a panel folds over the top aperture to close it. The closure panel is connected to the backing plate along a hinge line to allow the panel to be folded over the screen of the PC for protective storage or unfolded to expose the PC for use or for its removal from the sleeve.

INCORPORATION BY REFERENCE

This disclosure has been filed as part of an application which claims priority from earlier patent filings. Priority is claimed in respect of the following earlier Canadian filings: CA 2,736,642 filed Apr. 11, 2011; CA 2,740,909 filed May 17, 2011, and CA 2,759,096 filed Nov. 21, 2011.

The applicant hereby incorporates by reference all elements referred to in Articles 11(1)(iii)(d) or (e) of the PCT and all parts of the description, claims or drawings referred to in Rule 20.5(a) of the Rules under the PCT not otherwise contained herein but which is or are completely contained in any of the earlier applications from which priority is claimed.

The foregoing summarizes the principal features of the invention and some of its optional aspects. The invention may be further understood by the description of the preferred embodiments, in conjunction with the drawings, which now follow.

Wherever ranges of values are referenced within this specification, sub-ranges therein are intended to be included within the scope of the invention unless otherwise indicated or are incompatible with such other variants. Where characteristics are attributed to one or another variant of the invention, unless otherwise indicated, such characteristics are intended to apply to all other variants of the invention where such characteristics are appropriate or compatible with such other variants.

BRIEF DESCRIPTION OF THE DRAWINGS

FIG. 5A is a detail view in FIG. 5.

FIG. 15A is a detail view of Detail C in FIG. 15.

FIG. 16A is a Detail A view of the strap in FIG. 16 carrying the computer at the computer connection point.

DESCRIPTION OF THE PREFERRED EMBODIMENTS

Figure 1:
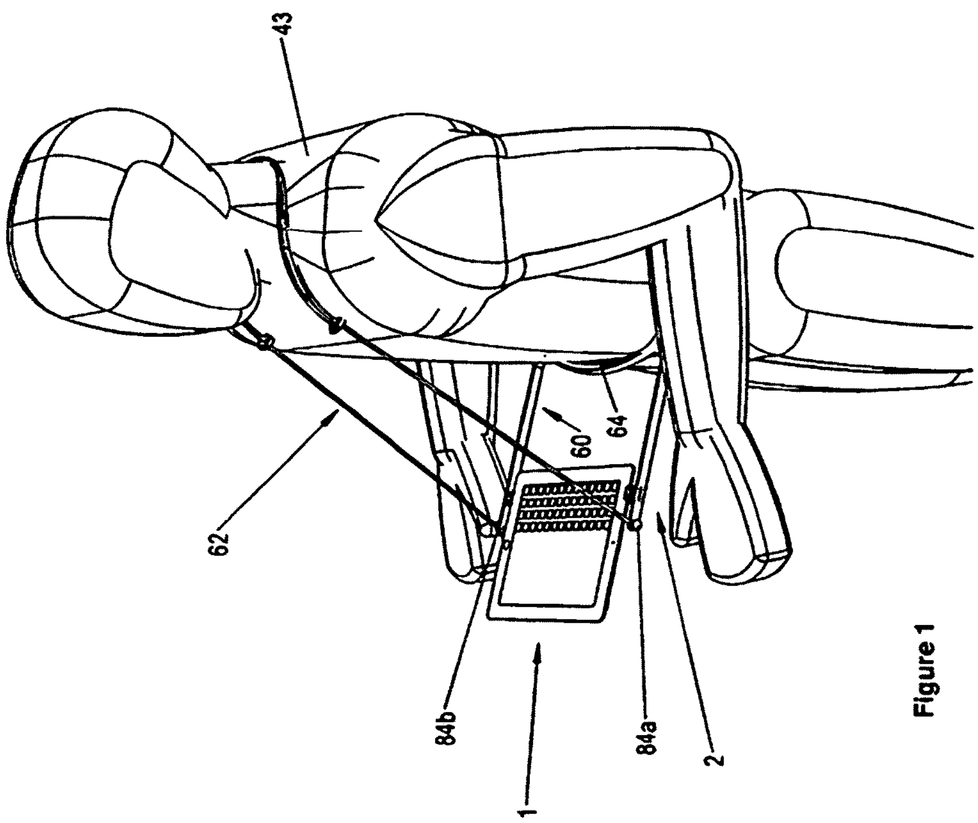
FIG. 1 illustrates the P-C carrier with its U-shaped swingarm unfolded to enable the user to comfortably walk about while operating the Pad-Computer with both hands.

FIG. 1 illustrates P-C carrier 2 with its U-shaped swingarm 60 unfolded and locked into the deployed position thereby enabling user 43 to comfortably walk about while operating P-C 1 with both hands.

User 43 adjusts the length of neck strap assembly 62 and the height of the abdominal contact portion 64 of swingarm 60 to obtain a comfortable fit that's suitable for efficient ergonomics during mobile computing tasks. Note that left and right swivels 84*a* and 84*b* suspend the apparatus near its axis of balance (i.e. somewhat towards the user) therefore said swingarm need only provide a small righting moment to maintain P-C 1 at the user's desired orientation.

Figure 2:
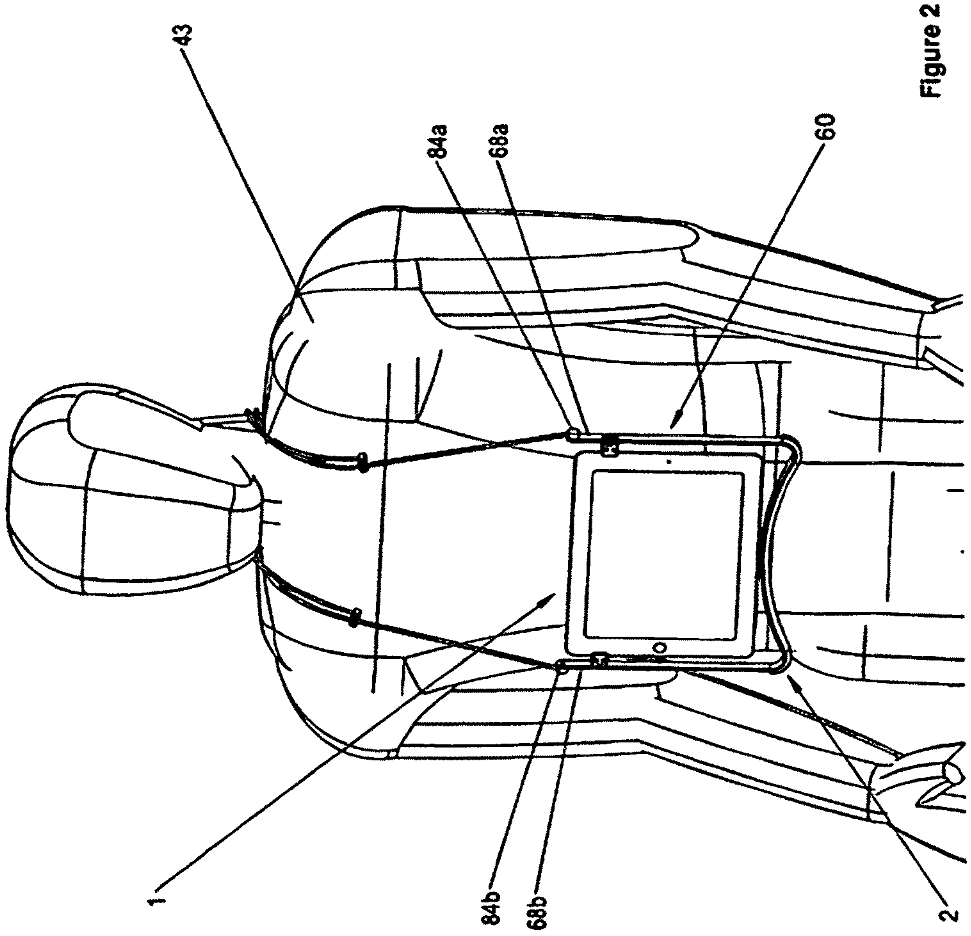
FIG. 2 illustrates the P-C carrier configuration of FIG. 1 with its abdominal contact bar fully folded to shift the assembly's balance point such that the compact Pad-Computer assembly hangs flat against the user's abdomen during transport.

FIG. 2 illustrates the P-C carrier of FIG. 1 after its swingarm 60 has been rotated and locked into its stored position. Note that by rotating said swingarm 180 degrees, its left and right cantilevered portions 84*a* and 84*b* become shifted away from the assembly's balance point such that it hangs comfortably flat against the user's abdomen during transport.

Figure 3:
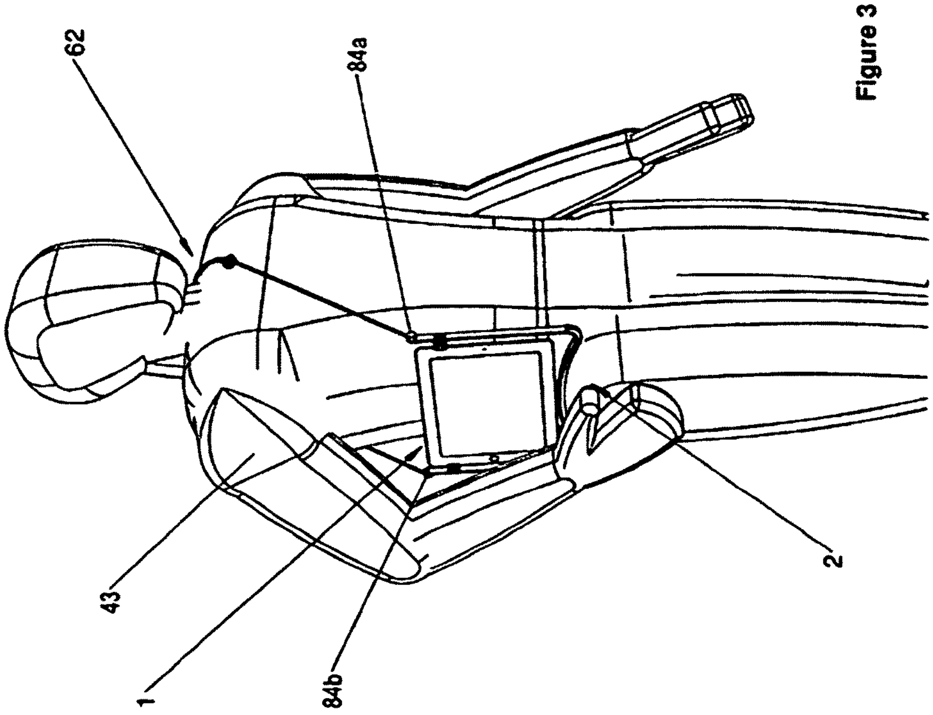
FIG. 3 illustrates the P-C carrier configuration of FIG. 2 with its neck strap lengthened for comfortably carrying the P-C while slung across the user's shoulder.

FIG. 3 illustrates the P-C carrier 2 of FIG. 2 with its neck strap lengthened for improved comfort while carrying the P-C 1 slung across user 43's shoulder. Again, the upwardly rotated position of swivels 84*a* and 84*b* insure that said P-C hangs comfortably.

Figure 4:
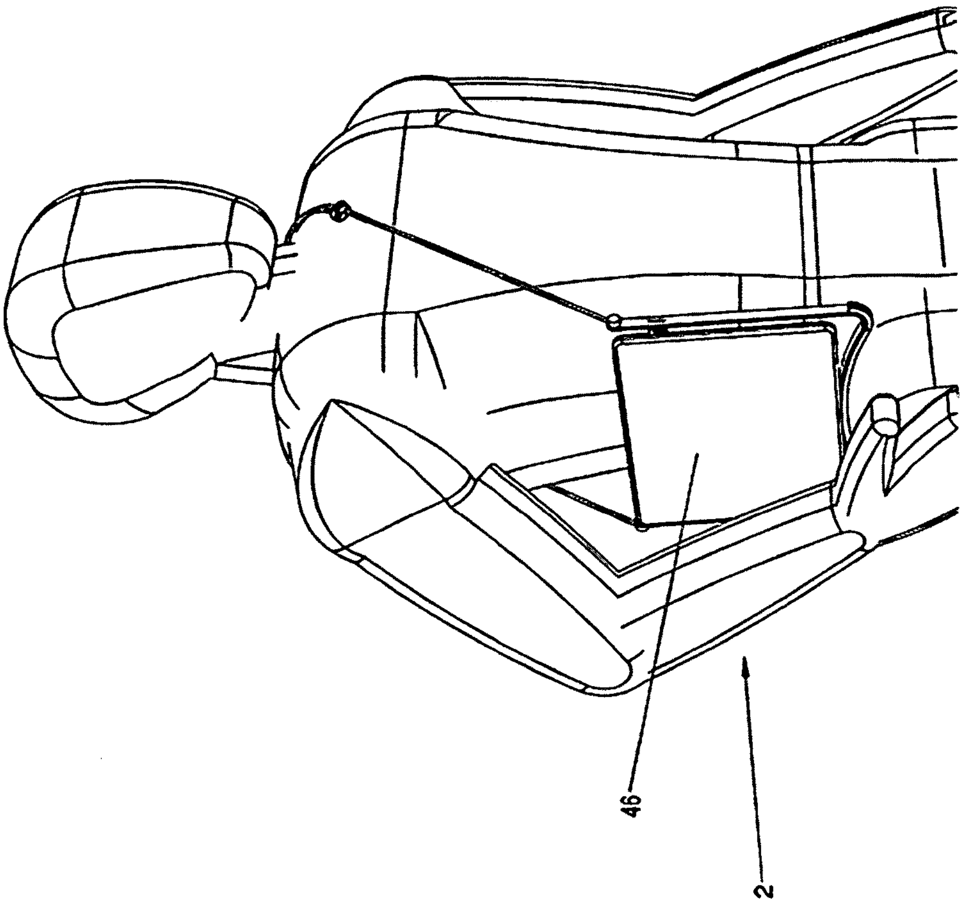
FIG. 4 illustrates the P-C carrier configuration of FIG. 3 with an optional accessory storage bag affixed over the P-C's touch screen.

FIG. 4 illustrates the P-C carrier configuration of FIG. 3 with optional accessory storage bag 46 affixed over the P-C's touch screen, thereby providing both a protective cover and a means for carrying sundry items. See FIG. 23 and FIG. 24 for details of fixation means for storage bag 46.

Figure 5:
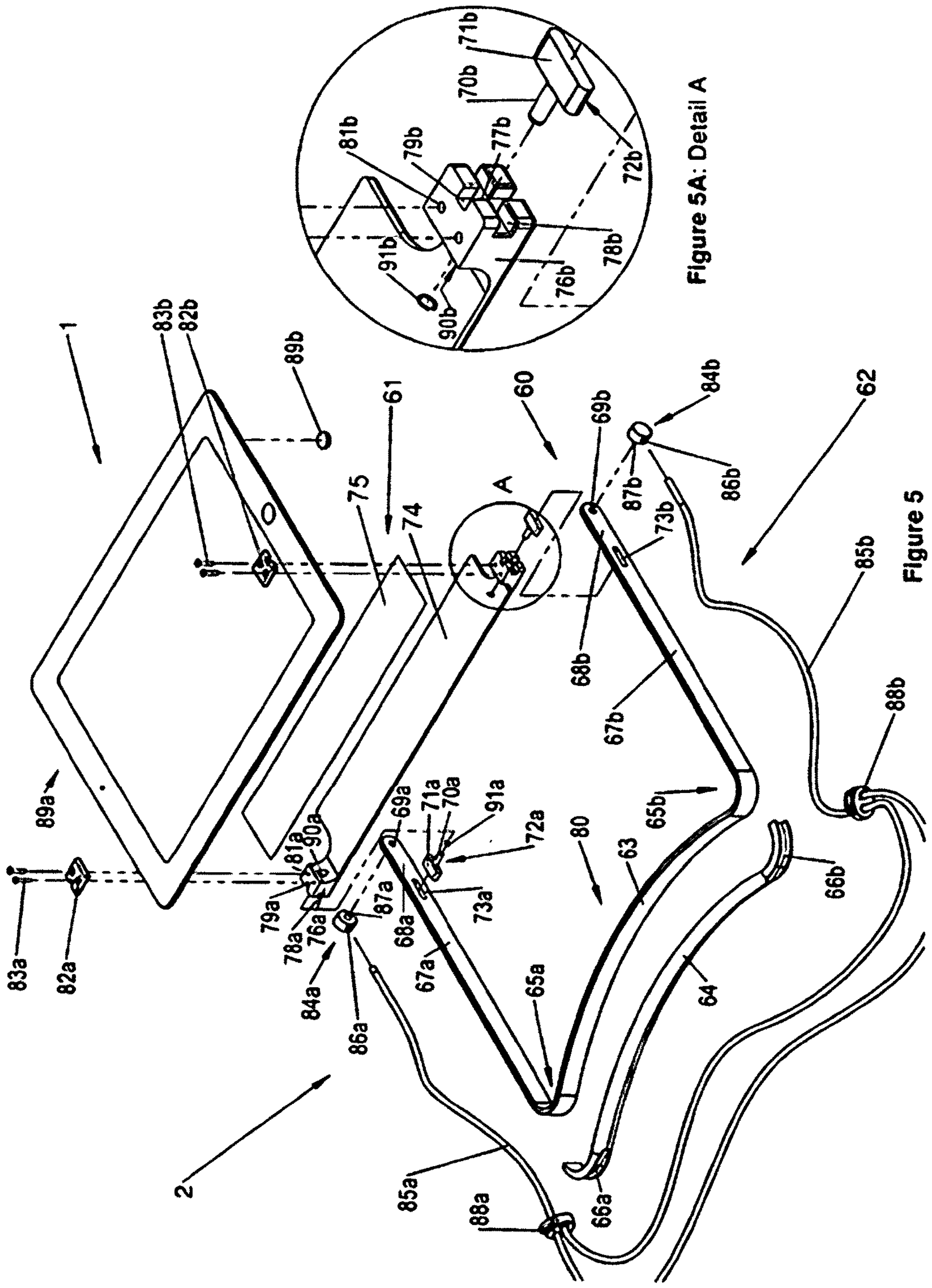
FIG. 5 illustrates a Pad-Computer (P-C) together with an exploded view of an embodiment of the present invention that utilizes a U-shaped swingarm and abdominal contact bar.

FIG. 5 illustrates P-C 1 together with an exploded view of an embodiment of carrier 2 that retro-fits onto existing P-Cs. This P-C carrier 2 is comprised of U-shaped swingarm assembly 60, "P-C outer case" assembly 61 and neck strap assembly 62.

U-shaped swingarm assembly 60 includes U-shaped swingarm 80 which typically is a bent metal strip comprised of abdominal contact portion 63 (also referred to as "bridge") joining left and right side-arm portions 67*a* and 67*b* which are formed by making left and right bends 65*a* and 65*b*. Said abdominal contact portion or bridge 63 is curved for comfortable fit onto typical users and may mount a foam rubber friction enhancer 64 for increased comfort and a more robust mechanical leverage for controlling the attitude of P-C 1 when worn as shown in FIG. 1. Left and right side-arms 67*a* and 67*b* each project linearly beyond the position of left and right swingarm pivot pins 70*a* and 70*b*. Cantilever-arm extensions 68*a* and 68*b* are used for mounting and positioning neck strap swivel mounts 69*a* and 69*b* into various support geometries as described below.

When fully assembled, left and right anti-rotation keys 71*a* and 71*b* protrude from the inner faces of said left and right side-arms. Each of said anti-rotation keys also extends fore and aft along said side-arms from their respective pivot pins 70*a* and 70*b* and are used in locking the rotation of swingarm 60 to enable the various operational modes described below. For ease of manufacturing swingarm 80 using conventional metal-forming techniques; pivot pins 70 and anti-rotation keys 71 may be formed together as left and right insert fixtures 72*a* and 72*b* and then press-fit into left and right fixation slots 73*a* and 73*b*. Alternatively, the protruding portions of inserts 72*a* and 72*b* may be formed monolithic to swingarm 80 using plastic injection-molding techniques (see FIGS. 11, 11A for the assembled U-shaped swingarm's general appearance).

The width of the swingarm's portion 63, the lengths of its two side-arm portions (67*a* and 67*b*) and the length of the two cantilever extensions (68*a* and 68*b*) are determined with respect to the dimensions of the particular P-C being carried (in this case an Apple iPad 2™). Said swingarm dimensions are chosen such that:

1) The assembled apparatus provides a comfortable and ergonomic spacing between the user's abdomen and the nearest edge of P-C 1. While being worn as shown in FIG. 1, a spacing of between 5" and 7" provides ample clearance for the user 43 to easily operate P-C 1 without neck strap interference.

2) The assembled apparatus enables swingarm 80 to fully rotate about P-C 1 such its curved portion 63 clears the furthest edge of P-C 1, thereby enabling the swingarm assembly 60 to fold flat around P-C 1 for optimally compact storage.

3) The assembled apparatus positions neck strap swivel mounts 69*a* and 69*b* such that when the swingarm is rotated and locked parallel to PC-1 at its extended position for wearing; swivels 84*a* and 84*b* are positioned along the opened assembly's natural axis of rotation (i.e. positioned such that the P-C will hang balanced and near horizontal as shown in FIG. 1). When the swingarm is then rotated 180 degrees into its compact storage position, swivels 84*a* and 84*b* are swung around on cantilever extensions 68*a* and 68*c* such that the folded apparatus becomes optimally suspended for carrying close to the user's body as shown in FIG. 2.

Figure 22:
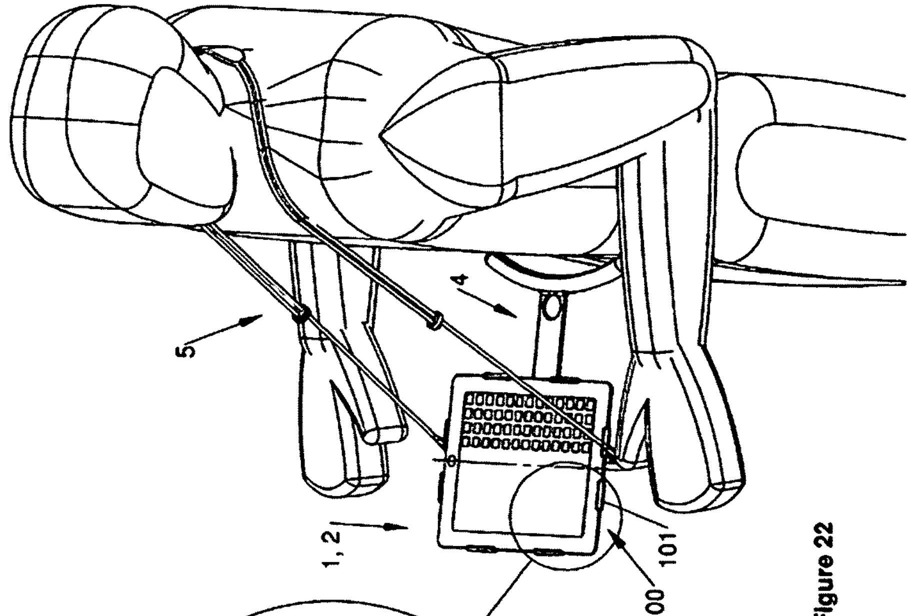
FIG. 22 illustrates the use of a wrap-around baseplate or sleeve that grips around the P-C.

"P-C outer case" 61 is so named because it is a means for affixing swingarm assembly 60 and neck strap assembly 62 onto the "case" of P-C 1. In one embodiment, this fixation means is comprised of an adhesive membrane and large baseplate. In another fixation embodiment, a baseplate with wrap-around "gripping fingers" is provided (as shown in FIG. 22). In another embodiment, clamps are provided (FIG. 15). In yet another embodiment of a "P-C outer case" (not illustrated), a complete "sleeve" or "outer case" is provided which houses the entire P-C while providing on its outer surface the pivot bores and keyway structure needed to adequately mount swingarm 60 and neck strap 62 as described below. All of these "outer case 61" embodiments are functionally equivalent to the "factory-built" embodiments shown in FIGS. 11, 12, 14, 18 and 19 (in that the required pivots and pivot-locking means are molded directly into the P-C's case during its manufacture).

The hybrid "P-C outer case" 61 shown in FIG. 5 is comprised of backplate 74 affixed to the lower surface of P-C 1 by means of suitably dimensioned, double-sided adhesive membrane 75. In order to provide greater adhesive contact area onto P-C 1, the width of backplate 74 may optionally be augmented with a rearward projecting flange as shown. In order to enable baseplate 74 to mount swingarm 60; left and right swingarm pivot bosses 76*a* and 76*b* are provided that extend outwards and upwards from the left and right ends of said baseplate. Said left and right pivot bosses may be formed monolithic to said baseplate as shown or else formed as a three-part bolted assembly (two bosses bolted one backplate). If a bolted backplate assembly is used (not illustrated); said left and right bosses are formed such that gripping plates 82*a* and 82*b* are monolithic to said bosses and said backplate forms the lower surface of the horizontal keyways 78*a* and 78*b* described below.

Said pivot bosses include (Detail A—FIG. 5A) left and right swingarm pivot-pin bores 77*a* and 77*b* formed at the intersections between two horizontal keyways 78*a* and 78*b* and two vertical keyways 79*a* and 79*b*; said pivot-pin bores and said keyways being configured for engagement with corresponding pivot-pins 70*a* and 70*b* and with corresponding anti-rotation keys 71*a* and 71*b*, which are formed on spring-biased swingarm 60 as described below.

In FIG. 5, anti-rotation keys are shown on both the left and right side-arm portions of bent swingarm 80. Left and right keys provide balanced locking symmetry however a single anti-rotation key may be provided on just the right or the left side-arm to enable slightly simplified position changes.

Slight spreading of the U-shaped swingarm's side-arms will correctly release anti-rotation keys 71*a* and 71*b* from their respective keyways on pivot bosses 76*a* and 76*b* while simultaneously maintaining pivot-pins 70*a* and 70*b* within their respective pivot-bores 77*a* and 77*b*. Applying a somewhat greater spreading force onto said side-arms can however enable complete withdrawal of said pivot-pins from said pivot-bores and thereby permit complete dismounting and separation of swingarm 60 from P-C outer case 61.

To prevent inadvertent (potentially catastrophic) separation of said swingarm, positive pin-retention means such as standard retaining-clips 91*a* and 91*b* may be affixed near the tips of said pivot-pins. Counter-bores 90*a* and 90*b* configure pivot-pin bores 77*a* and 77*b* for sufficient axial travel to permit proper engagement and disengagement of the anti-rotation keys 71 into keyways 78 and 79 as required.

The use of retaining-clips 91*a* and 91*b* to prevent inadvertent separation of swingarm 60 (and its attached neck strap 61) is problematic if, for whatever reason, the user wishes to remove the swingarm (such retaining-clips are quite difficult, to remove). To address this concern, a quick-release version of said pivot-pins may be provided. For example: a "key and keyhole" means of affixing neck strap swivels (not illustrated) may be provided to enable the "keyed" swivel-pin to be withdrawn from its "keyholed" pivot-bore if and only if said swivel is rotated to a particular angular orientation. That same type of "positive-engagement but quick-release" fixation means may also be used to configure pivot-pins 87*a* and 87*b* to prevent inadvertent separation of neck strap assembly 62. To implement the preferred swingarm quick-release described above, each pivot-pin's "keyhole flange" should be oriented such that the swingarm's pivot-pins can only be withdrawn when the swingarm is oriented towards the user for wearing but positioned somewhat above its horizontal locking position #1 (this minimizes the chance of inadvertent detachment during normal folding and unfolding operations).

To strengthen the adhesive fixation of carrier 2 onto P-C 1; left and right pivot bosses 76*a* and 76*b* include holes 81 for mounting left and right gripping plates 82*a* and 82*b* using screws 83*a* and 83*b*. Gripping plates 82*a* and 82*b* are configured for positive engagement onto the upper surface of P-C 1 in a manner similar to that shown in FIG. 22 thereby more securely mounting baseplate 75 and swingarm 60 to P-C 1. To better support P-C 1 when it's stored flat as shown in FIG. 6; rubber shim feet 89*a* and 89*b* may be affixed to the lower side of said P-C.

Neck strap assembly 62 is comprised of left and right neck strap swivel bodies (84*a* and 84*b*), left and right neck strap cords (85*a* and 85*b*) and left and right cord-length adjuster (88*a* and 88*b*). Said left and right neck strap swivel bodies mount concentric swivel pins 87*a* and 87*b* which are rotatably mounted into left and right swivel mounts 69*a* and 69*b* on U-shaped bent swingarm 80. For suitable fixation into said swingarm mounts, the tips of said swivel-pins may be loosely riveted into suitably formed swivel mounts 69*a* and 69*b*, thereby minimizing bulk and providing smooth inner swingarm faces that facilitate other low-clearance embodiments of the invention (see FIG. 11). Other rotatable fixation means for said swivel bodies such as a threaded end caps, or the "key and keyhole" quick-release mounts described above may be used.

Left and right neck strap cords 85*a* and 85*b* affix to their respective swivel bodies: one simple but effective fixation means being to pass said cords through apertures 86*a* and 86*b* and form a knot or other end-thickening to prevent their withdrawal. In a preferred embodiment; "push-button, dual-hole cord-locks" 88*a* and 88*b* are used to provide a more compact and easily adjusted means of varying the length of neck strap 62 than can be provided by the more common adjusters used to vary the length of flat neck straps. To exploit such off-the-shelf cord-locks, each neck strap cord (for example 85*a*) passes through a lockable first hole of its nearest cord-lock (88*a*) and terminates by affixing through the second hole of its furthest cord-lock (88*b*). Cord fixation to said cord-lock is typically made in the same manner as that used to affix said cord to a swivel body 84. By releasing both cord-locks so that both cords are free-running through said first holes, the user can easily vary the neck strap's overall length by sliding both cords slide behind their neck (see FIGS. 1 and 22). Conventional "sliding buckle" types of neck strap adjusters or relatively bulky off-the-shelf neck straps made for cameras may also be used together with suitably configured swivel bodies 84*a* and 84*b*.

Figure 6:
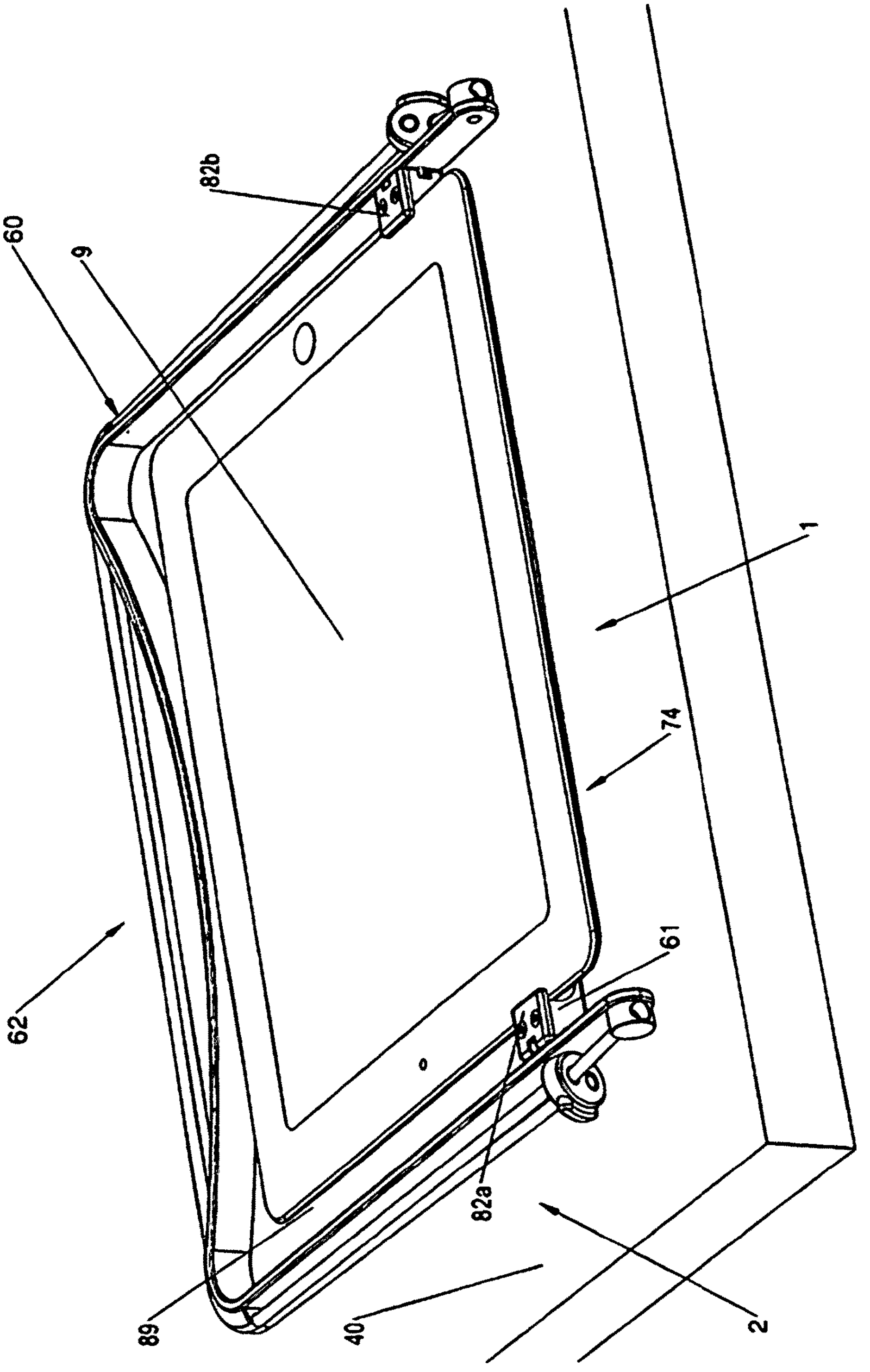
FIG. 6 illustrates the P-C carrier of FIG. 5 assembled and affixed to its Pad-Computer and with its swingarm rotated to its storage position.

Efficient neck strap storage may be affected by shortening the overall length of neck strap 60 and placing cords 85*a* and 85*b* into cord-guides 66*a* and 66*b* such that the stored neck strap is pulled taught around the exterior of bent swingarm 80 (see FIG. 6). Alternatively; if quick-release swivels are use, neck strap assembly 62 may be completely removed and stored separately in the accessory bag shown in FIGS. 23 and 24.

FIG. 6 illustrates the P-C carrier 2 of FIG. 5 when fully assembled and affixed to P-C 1. U-shaped swingarm or "body propping member" 60 has been rotated into its fully-folded storage position and then placed onto tabletop 40. Note that the overall height of P-C carrier 2 is slightly greater than that of P-C 1. Carrier 2 thereby provides three substantial means of protection to said P-C:

1) The P-C's four corners are effectively surrounded by swingarm assembly 60.

2) The P-C's front lower surface is protected and raised above tabletop 40 by the thickness of backplate 74 (not visible). The P-C's rear lower surface is typically also raised and protected by one or more adhesive rubber feet 89 (also not visible).

3) The P-C's upper surface and touch screen 9 may also be protected by adhering additional rubber feet to its upper surface (not illustrated). The shimming and shock absorption afforded by said feet 89 and said gripping plates 82*a* and 82*b* thereby enable the user to lay the folded assembly face-down onto a tabletop without concern for damage resulting from contact between the two surfaces.

Figure 7:
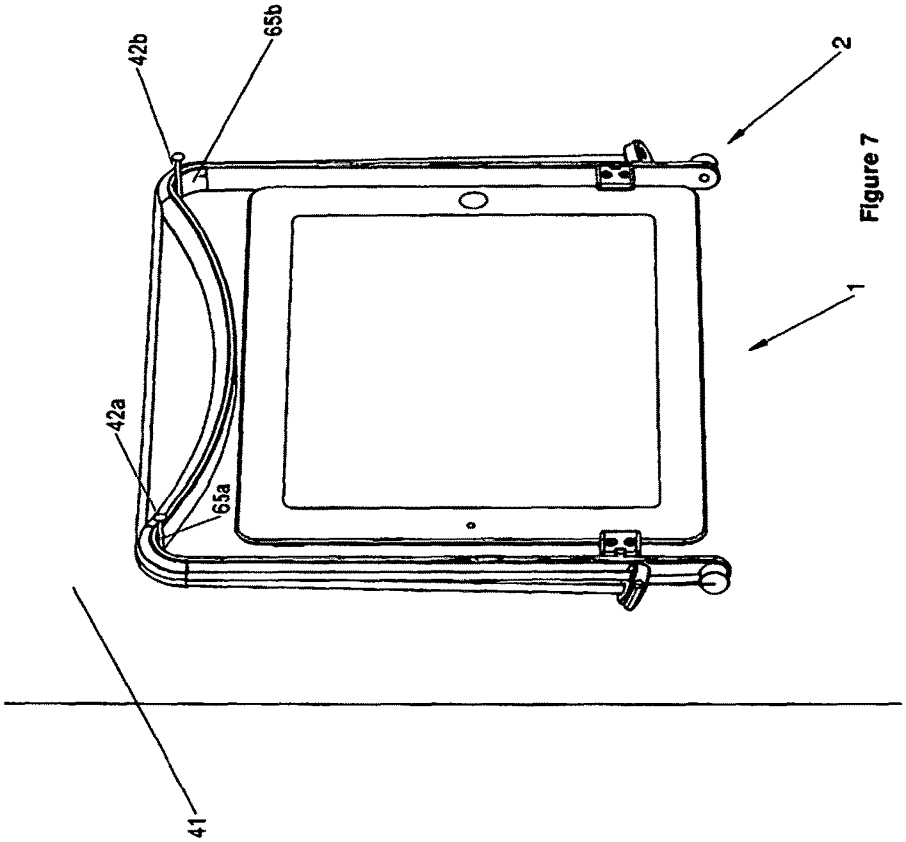
FIG. 7 illustrates the P-C carrier configuration of FIG. 6 when hung onto a wall.

4) If the width of material used to fabricate U-shaped swingarm 60 is greater than the thickness of the P-C 1 being carried in carrier 2 (i.e. approximately 0.5" wide as shown in FIG. 6 for carrying an Apple iPad which is only 0.35" thick), then the upper and lower edges of the swingarm will serve to protect the upper and lower surfaces of said P-C while still permitting the tablet computer's clean styling to be plainly visible, FIG. 7 illustrates the P-C carrier 2 configuration of FIG. 6 after being hung onto a wall 41 in a similar manner to the embodiment shown in FIG. 3. Left and right mounting nails 42*a* and 42*b* are driven into said wall to enable stable flush-mounting of P-C 1 by suspending it on said nails at bends 65*a* and 65*b*. To minimize damage to the wall a separate wall-hanging bracket (not illustrated) that is comprised of a horizontal bar having a central wall fixation hole and two perpendicular end prongs that fit into bends 65*a* and 65*b*.

Figure 8:
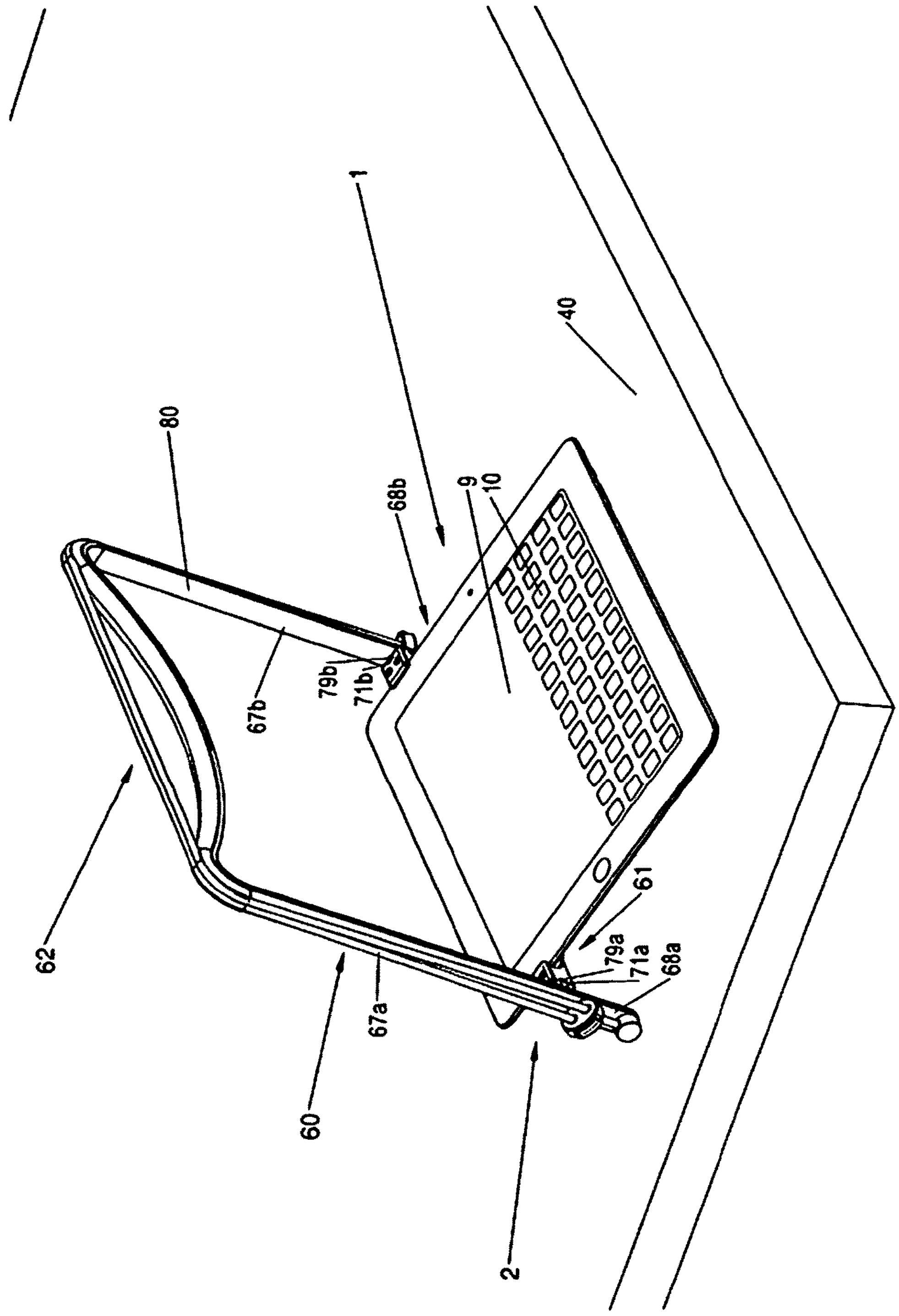
FIG. 8 illustrates the P-C carrier with its U-shaped abdominal contact bar rotated for supporting the P-C at a shallow angle with its virtual keyboard displayed in landscape mode for optimal typing efficiency on a desktop.

FIG. 8 illustrates P-C carrier 2 with swingarm 60 rotated at right angles to P-C 1 such that it enables said carrier to support virtual keyboard 10 at its preferred orientation for typing on desktop 40. Left and right anti-rotation keys 71*a* and 71*b* are engaged into left and right vertical keyways 79*a* and 79*b*; thereby locking swingarm 60 such that its two (short) cantilevered portions 68*a* and 68*b* act as support props for tilting P-C 1 up towards the user at a shallow angle for efficient typing on virtual keyboard 10.

Figure 9:
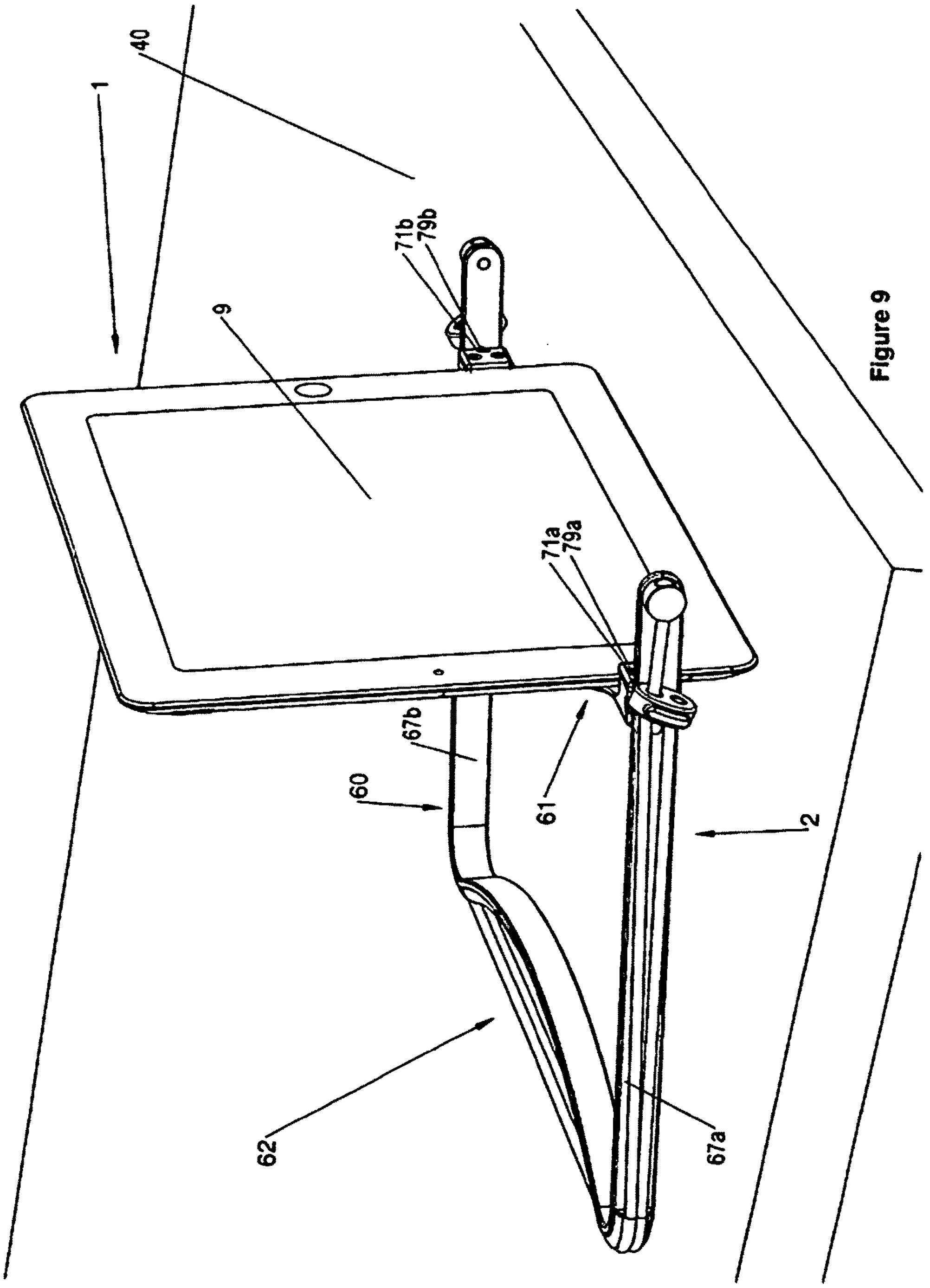
FIG. 9 illustrates the P-C carrier of FIG. 8 reconfigured and placed on a tabletop at a steep angle for viewing of the P-C's touch screen in landscape mode.

FIG. 9 illustrates the P-C carrier of FIG. 8 after being reconfigured by rotating its swingarm assembly 60 through 180 degrees. Left and right anti-rotation keys 71*a* and 71*b* are re-engaged into left and right vertical keyways 79*a* and 79*b* thereby locking swingarm 60 such that its two side-arm portions 67*a* and 67*b* support the lower portion of P-C 1 in landscape orientation at a very steep angle on desktop 40. This steep viewing angle is appropriate for watching images or videos or else for data input when used in conjunction with an external keyboard places on the tabletop in front of it (not illustrated).

Figure 10:
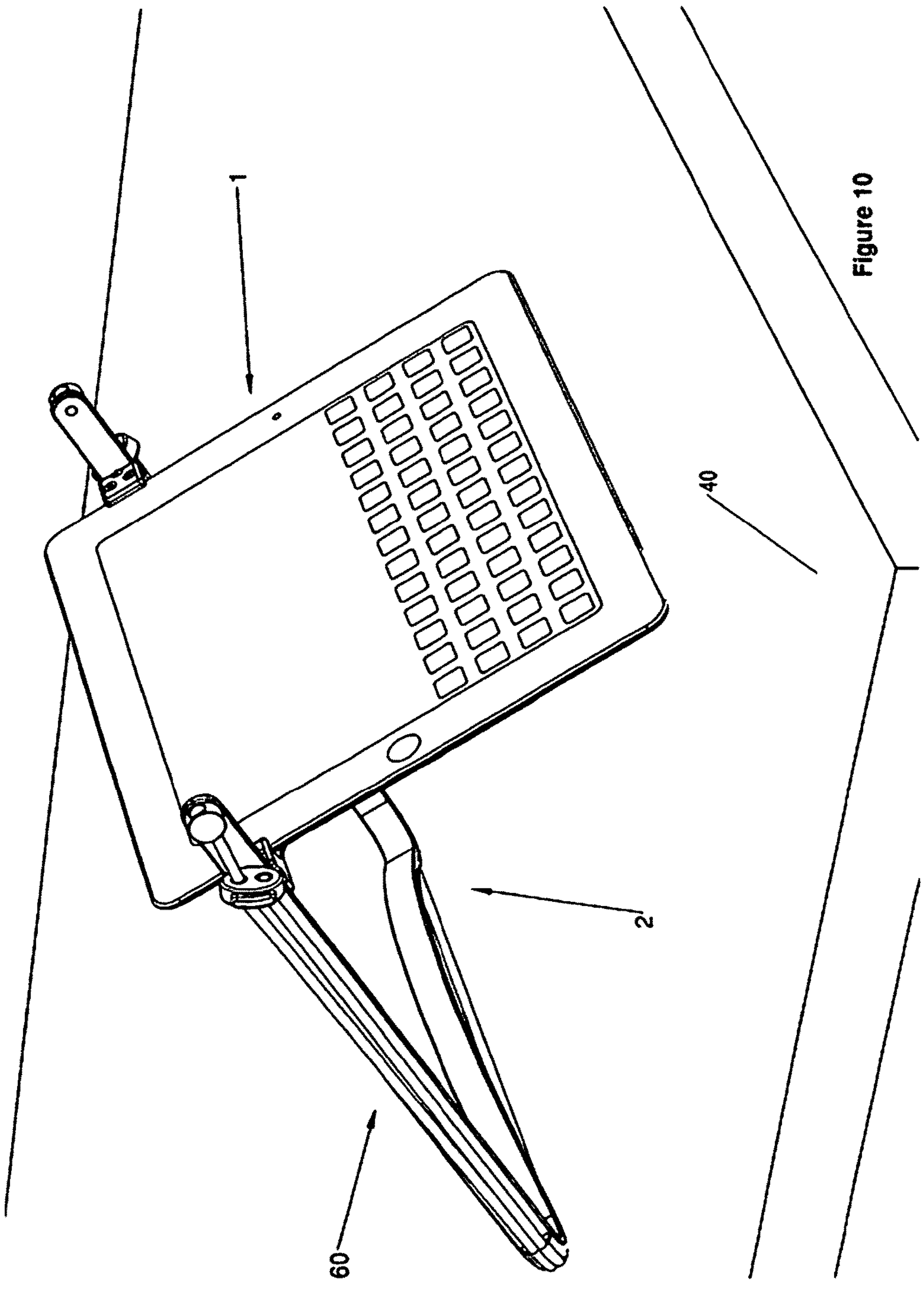
FIG. 10 illustrates the P-C carrier configuration of FIG. 9 rotated and placed on a tabletop at a different steep angle for viewing of the P-C's touch screen in landscape mode.

FIG. 10 illustrates the same P-C carrier shown in FIG. 9 after being reoriented and placed back onto tabletop 40 such that swingarm 60 supports the upper portion of P-C 1 in landscape orientation at a moderately steep angle that can be comfortably used for a wide variety of computing tasks.

Figures 11, 11A:
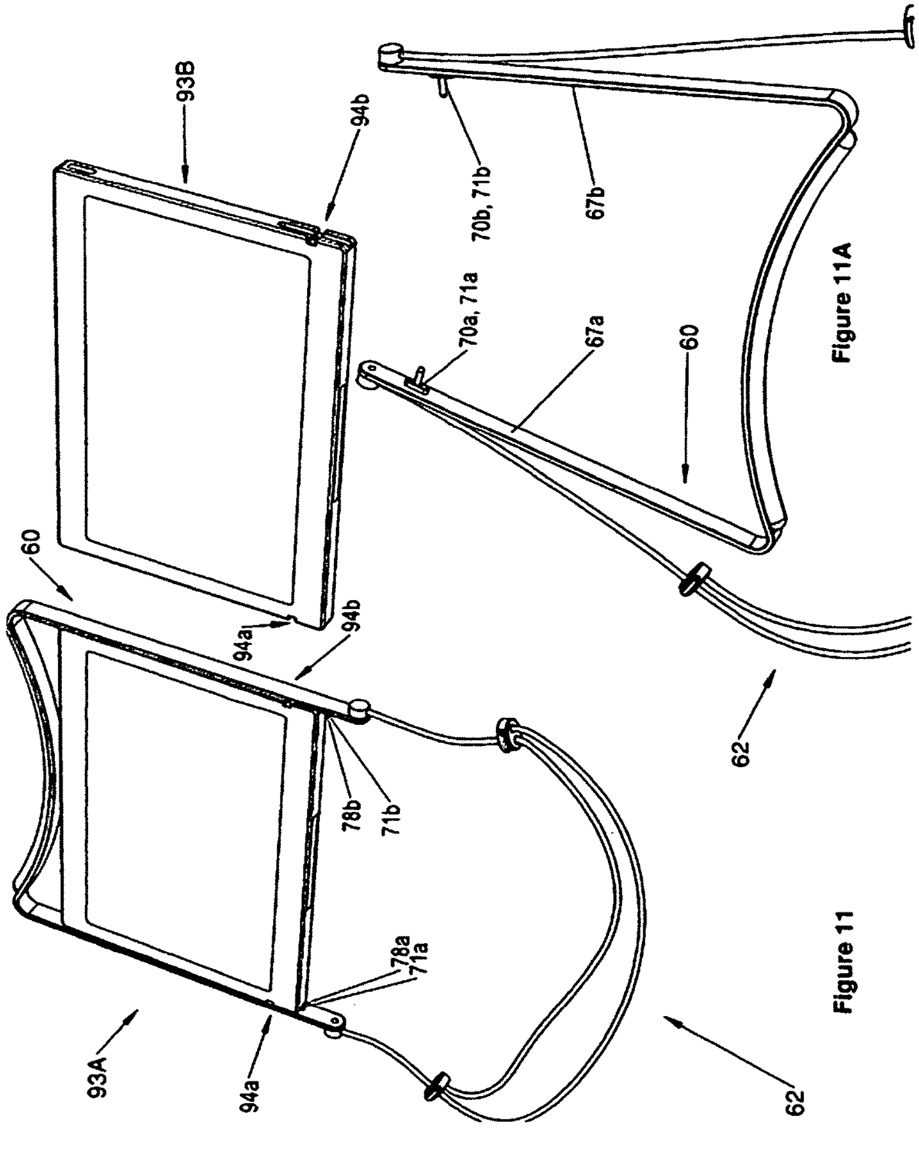
FIG. 11 illustrates a Pad-Computer (P-C) together with an exploded view FIG. 11A of an embodiment of the present invention that utilizes a U-shaped swingarm mechanism that is integrated directly into the case of a newly manufactured P-C instead of being affixed onto the case of an existing P-C.
FIG. 11A is the exploded version of FIG. 11.

FIG. 11 illustrates two examples of a purpose-built Pad-Computer 93 (P-C 93*a* shown on the left and P-C 93*b* shown on the right). This purpose-built P-C embodiment of the invention directly incorporates mounting means for U-shaped swingarm 60 into said P-C's structure: left and right swingarm mounts 94*a* and 94*b* are molded directly into the case of said purpose-built P-C 93 (instead of being retro-fitted onto the case of an existing P-C using an outer case as described above). P-C 93*a* illustrates said purpose-built P-C with its swingarm assembly 60 and its neck strap assembly 62 assembled and configured for use as shown in FIG. 2 and FIG. 7 (i.e. left and right keys 71*a* and 71*b* are engaged into left and right horizontal anti-rotation keyways 78*a* and 78*b*).

The right-hand example of this embodiment of the invention (P-C 93*b* in FIG. 11A) is exploded for clarity in FIG. 11A and shows swingarm assembly 60 and neck strap assembly 62 separated from P-C 93*b*. Note the convergence of left and right side-arm portions 67*a* and 67*b* which engender an inward spring biasing of pivot-pins 70*a*, 70*b* and anti-rotation keys 71*a*, 71*b*. Also note that molded swingarm mounts 94*a* and 94*b* are comprised of the same 3 indentations that are formed into left and right pivot bosses 76*a* and 76*b* shown in FIG. 5 (each mount is comprised of a swingarm pivot bore, a horizontal anti-rotation keyway and a vertical anti-rotation keyway). By molding said mount-indentations directly into the left and right sides of purpose-built P-C 93's case, the need for said retro-fitted bosses is eliminated (i.e. the entire P-C outer case assembly 61 becomes redundant and is therefore eliminated from this embodiment of the invention).

FIG. 11A illustrates how swingarm 60 is shaped such that swivel mounts 69*a* and 69*b* are closer together than bends 65*a* and 65*b*, thereby forming a converging U-shaped spring which, when forced open and fitted onto P-C outer case 61, will automatically bias pivot-pins 70*a* and 70*b* and anti-rotation keys 71*a* and 71*b* into their respective bores and keyways.

Said pivot-pins project substantially further from bent swingarm 80 than said anti-rotation keys, thereby enabling the user to pull outward on arms 67*a* and 67*b* to release said keys from said keyways while maintaining said pivot-pins in their respective pivot bores. This spring-biased pivot and key engagement system thereby enables swingarm assembly 60 to be selectively rotated and locked into four positions as needed to realize the present invention's various usage modes. Its four possible positions are:

1) Swingarm locked horizontally in its extended position for wearing as shown in FIG. 1.

2) Swingarm rotated 180 degrees from position #1 and locked into its flat storage position as shown in FIG. 6.

3) Swingarm rotated 90 degrees from position #2 and locked into its desktop keyboarding position as shown in FIG. 8.

4) Swingarm rotated 180 degrees from position #3 and locked into its desktop viewing positions as shown in FIGS. 9, and 10.

To rotate swingarm 60 assembly to any of the above four usage configurations, the user simply pulls outwards on both of the spring-biased, U-shaped swingarm's two side-arms far enough to release both of its anti-rotation keys from their respective keyways. If the swingarm is deployed in position #1, position #3 or position #4 then this keyway release action will instantly allow gravity to rotate both swingarm and P-C upwards and towards each other to facilitate folding into the position #2. If the swingarm is already in position #2 then keyway release will allow gravity-driven unfolding to re-commence in the same rotational direction towards any of the 3 other swingarm positions and the user simply manipulates the side-arms so as to allow the swingarm's spring-biasing to automatically lock said keys into said keyways at the desired position.

Figure 12:
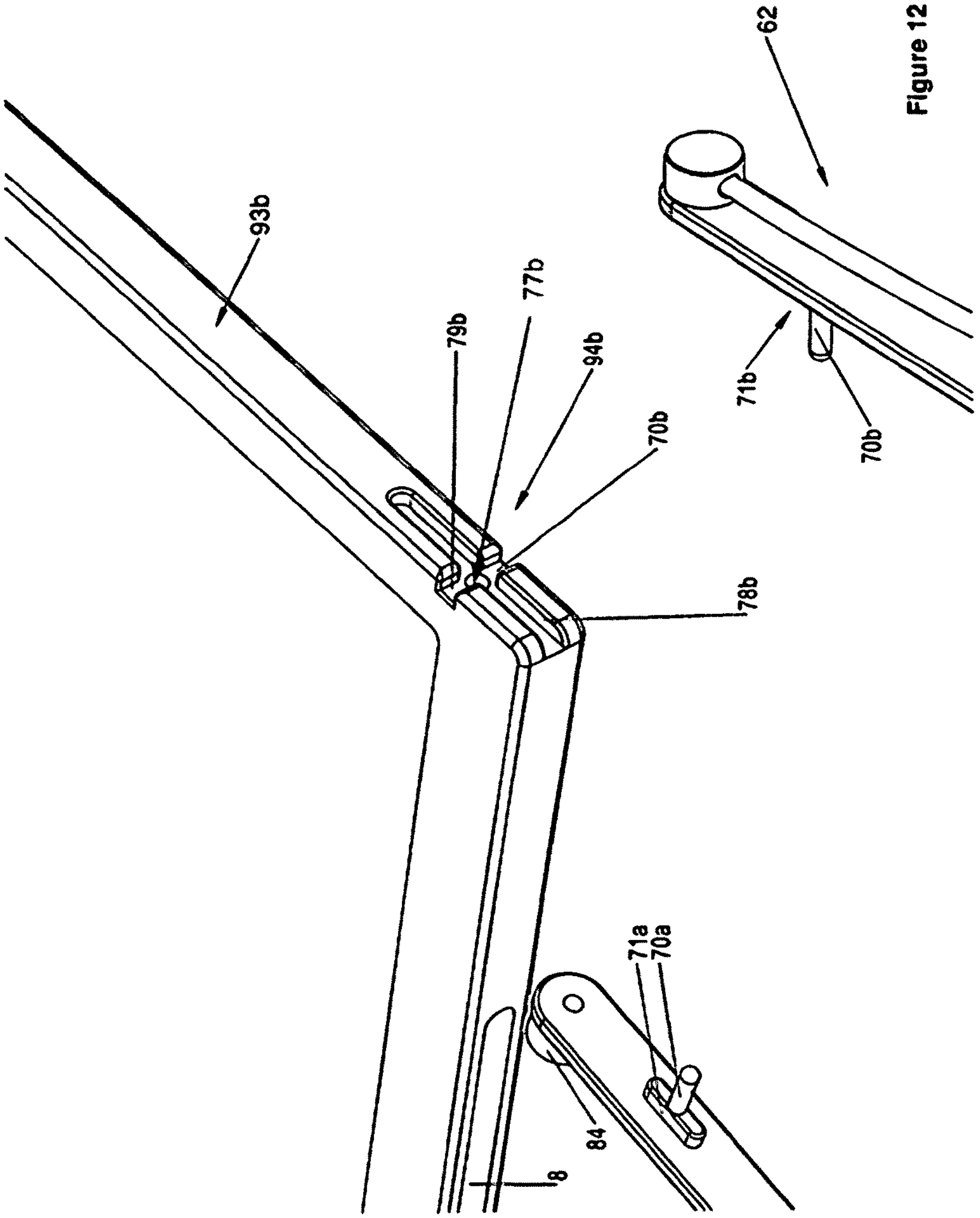
FIG. 12 illustrates details of the embodiment shown in FIG. 11 in exploded view.

FIG. 12 illustrates large-scale details of the exploded P-C 93 shown in FIG. 11. Right swingarm mount is comprised of three indentations molded into the right side of said P-C. Right swingarm pivot bore 77*b* receives right swingarm pivot-pin 70*b*. Right horizontal keyway 78*b* and right vertical keyway 79*b* receive right anti-rotation key 71*b* as required to configure swingarm 60 into various operation modes as described above. Note that this embodiment of the invention demands that the purpose-built P-C be internally constructed to accommodate left and right mounts 94*a* and 94*b* as well as to position data ports 8 for unobstructed access.

Figure 13:
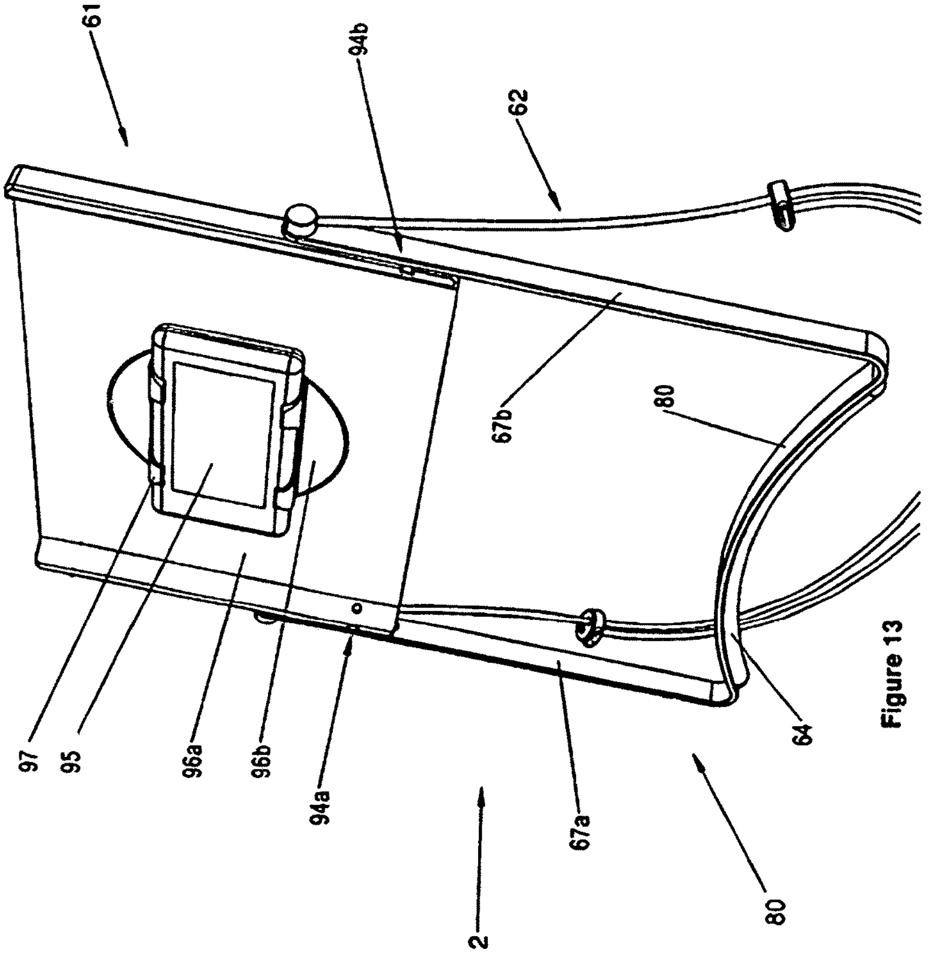
FIG. 13 illustrates a general-purpose embodiment of the invention that affixes to smaller P-Cs such as "Smart Phones".

The embodiment shown in FIG. 13 is also aimed at enabling wearability of a small PC. That embodiment uses a general-purpose clip to rotatably affix the small PC to the swingarm and neckstrap needed to enable its wearability.

FIG. 13 illustrates a general-purpose embodiment of the invention used for carrying smaller P-Cs such as handheld "Smart Phone" 95. P-C carrier 2 is comprised of the same three basic elements as shown in FIG. 5: U-shaped swingarm assembly 60, P-C "outer case" assembly 61 and neck strap assembly 62. To accommodate carrying the form factor and user interface of Smart Phones such as P-C 95, outer case 61 is comprised of platform 96*a* which is sized to permit P-C 95 to be temporarily affixed to its upper surface in either landscape orientation or portrait orientation using a plurality of biased clips 97. Said clips are typically mounted to turntable 96*b* which permits the user to selectively orient their P-C for different tasks. For example: if the user is being guided by a GPS animated map displayed on a web browser while walking about as shown it FIG. 1, then they might choose to orient P-C 95 horizontally as shown. If they then wish to make a phone call using their P-C's speakerphone function they can rotate turntable 96*b* 90 degrees to utilize the telephony function's user interface. At any time, the user can quickly remove said P-C from clips 97 for conventional handheld usage.

Platform 96*a* includes the same purpose-built left and right swingarm mounts 94*a* and 94*b* described above, thereby permitting swingarm 60 and its attached neck strap 62 to mount to outer-case 61. This embodiment of P-C carrier 2 thereby enables a Smart Phone such as P-C 95 to be conveniently carried about or used in the various desktop or wall-hung usage modes described above.

Figure 14A:
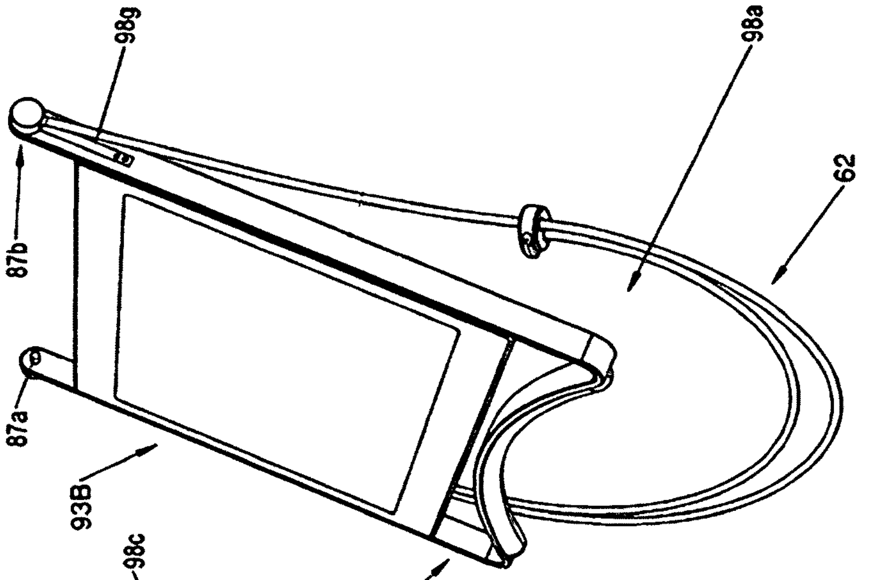
FIG. 14A shows the embodiment of FIG. 14 shown in stored position.
Figure 14:
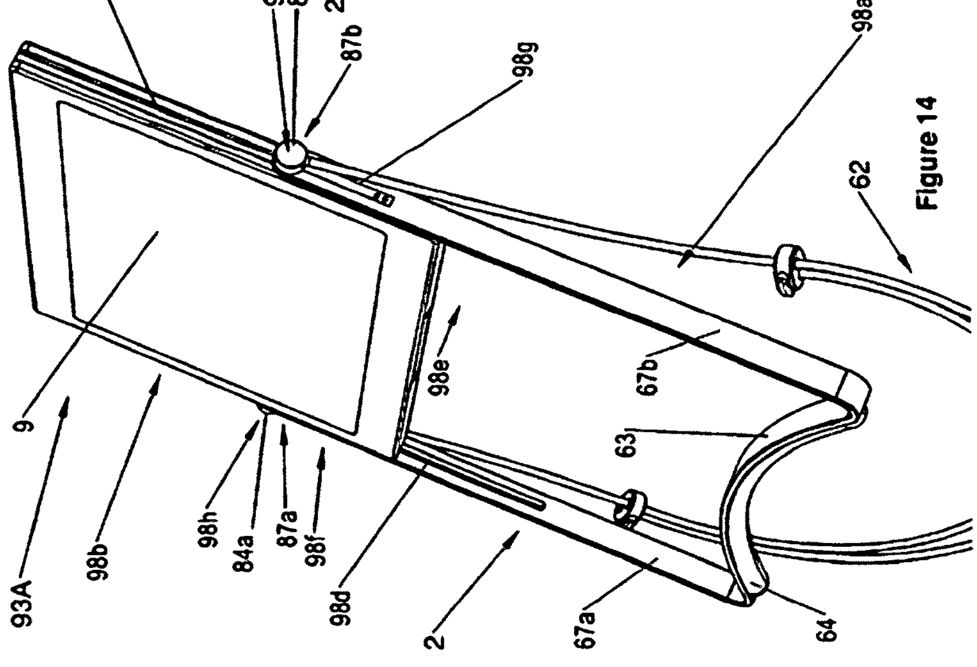
FIG. 14 illustrates an embodiment of the invention that utilizes a sliding U-shaped handle to enable the wearing function of a swingarm shown in deployed position.
Figure 15:
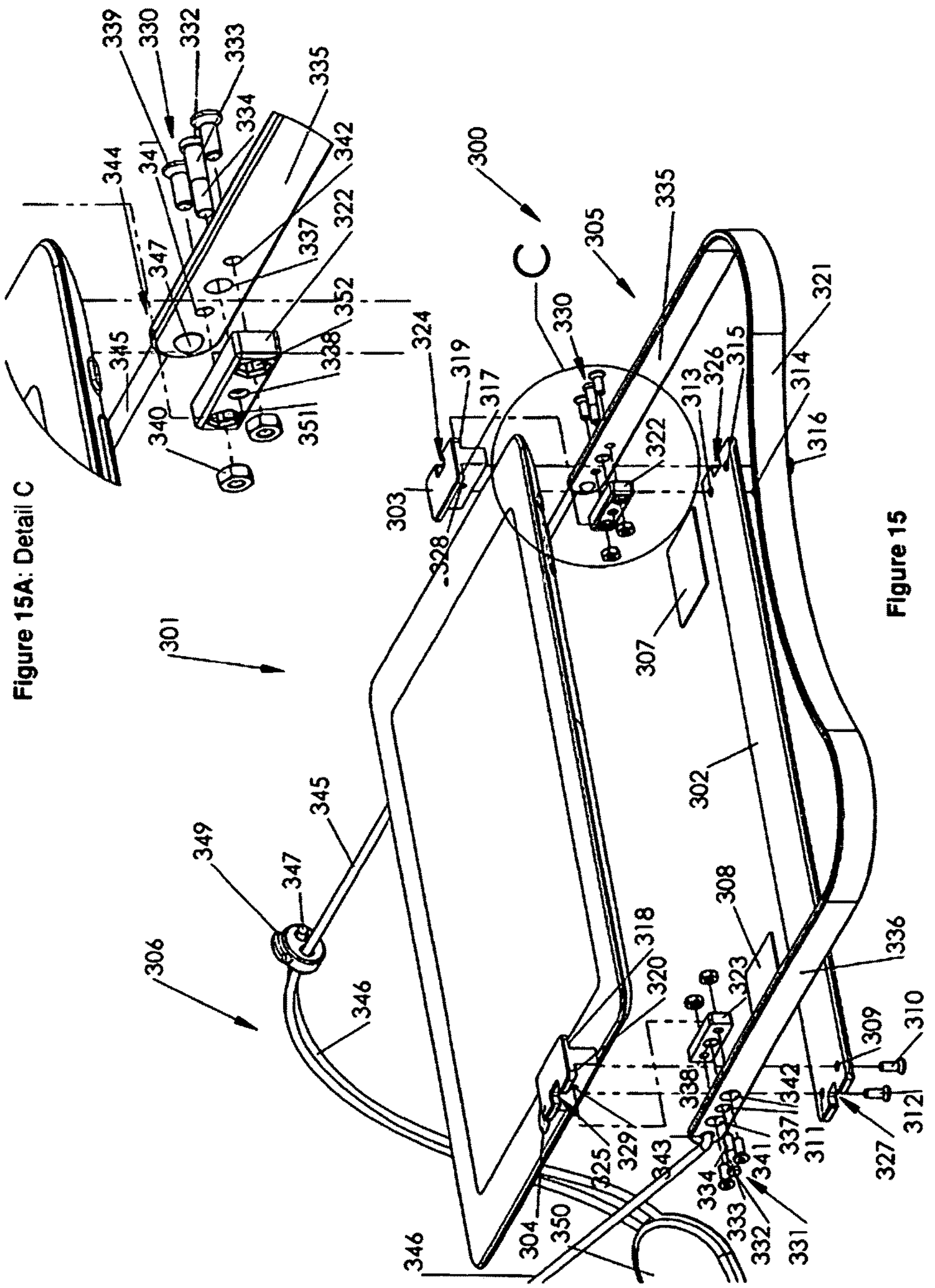
FIG. 15 illustrates in exploded view various construction details of a preferred embodiment of the PC carrier that is easily manufactured.

FIGS. 14 and 14A illustrate two instances of another, embodiment of carrier 2 which (like the embodiment of FIG. 11) utilizes a purpose-built P-C to eliminate the need for a P-C outer case assembly (the left instance in FIG. 14 labeled P-C 93*a* and the right instance in FIG. 14A labeled 93*b*). Instead of using a swingarm assembly that rotates to enable hands-free wearing (as shown in the embodiments described above) this embodiment of the purpose-built P-C utilizes a U-shaped abdomen spacer 98*a* having left and right dovetail protrusions 98*d* and 98*e* that slide along matching dovetail grooves 98*b* and 98*c* formed into the left and right sides of purpose-built P-C 93*a* (shown in FIG. 14). U-shaped abdomen spacer 98*a* mounts left and right rotatable neck strap swivels 84*a* and 84*b* for use with neck strap assembly 62 as in previous embodiments described above.

Figure 24:
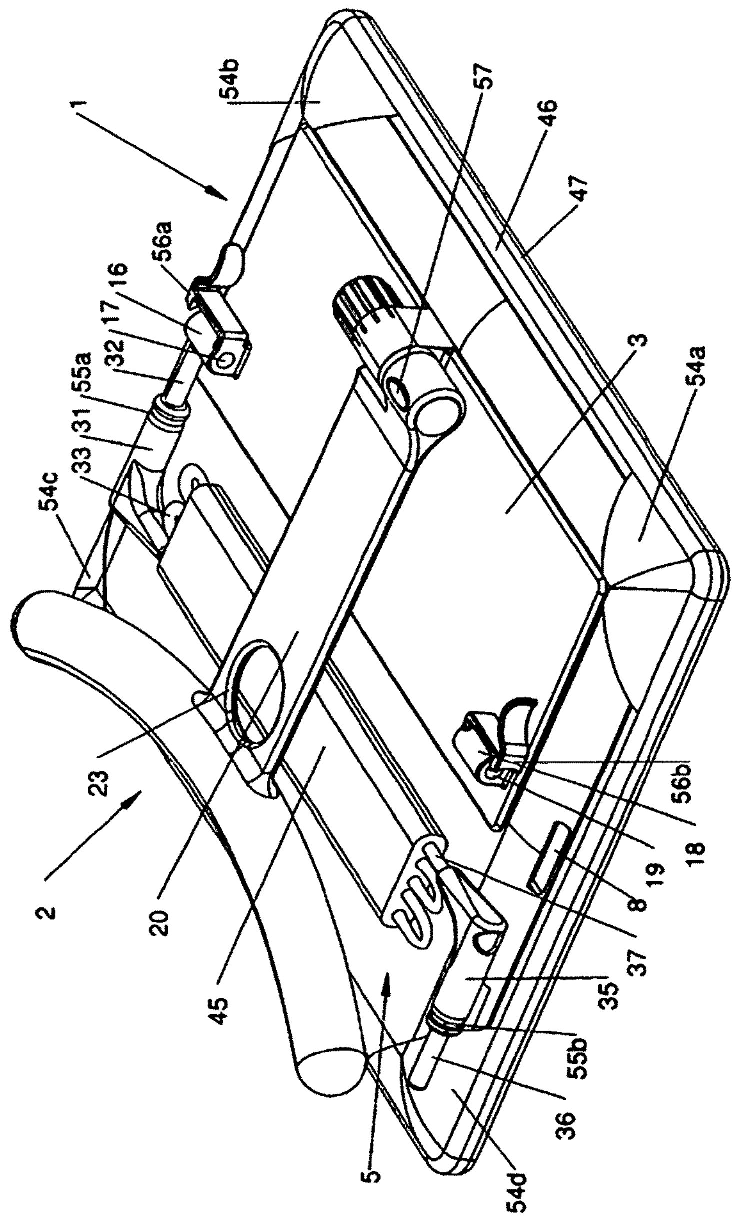
FIG. 24 illustrates details of how the accessory bag pockets fit over the computer corners, and how the backplate of FIG. 23 may be configured for storage of the support arm and neckstrap cord portions.

Left and right spring members 98*f* and 98*g* engage into annular slots on said swivels 84*a* and 84*b*, thereby biasing them into their respective swivel bores formed through the left and right left and right side-arms 67*a* and 67*b* of said U-shaped abdomen spacer 98*a*. Said left and right neck strap swivels include elongated swivel pins 87*a* and 87*b* (not visible) that are journaled through said swivel bores and that also selectively engage into left and right locking holes 98*h* and 98*i* (also not visible) that are formed into the bottom of left and right dovetail grooves 98*b* and 98*c*, thereby enabling said elongated swivel-pins to lock and prevent U-shaped abdomen spacer 98*a* from sliding relative to purpose-built P-C 93*a*. Locking holes 98*h* and 98*i* are positioned along their respective grooves 98*b* and 98*c* such that when inwardly biased swivels 84*a* and 84*b* are engaged into them, neck strap assembly 62 suspends P-C 93*a* at its balance point (i.e. it hangs balanced like the P-C shown in FIG. 1). When thusly locked, side-arms 67*a* and 67*b* are configured such that curved abdominal portion 63 and friction portion 64 space P-C 93*a* from the user for comfortable hands-free operation (as shown in FIG. 24).

Shown in FIG. 14A is P-C 93*b* after the user has reconfigured the purpose-built PC for compact carrying by neck strap 62 (as shown in FIG. 2). To enable U-shaped abdomen spacer 98*a* to slide into this carrying configuration; the user pulls outward on swivels 84*a* and 84*b*, thereby withdrawing elongated pivot pins 87*a* and 87*b* from their respective locking holes 98*h* and 98*i* formed at balance points in dovetail grooves 98*b* and 98*c*. Once unlocked, swivels 84*a* and 84*b* as well as abdominal contact pad 64 will slide easily into the desired carrying configuration. Once P-C carrier 2 is closed for carrying as shown, elongated swivel-pins 87*a* and 87*b* will snap into their fully biased positions, thereby preventing abdominal spacer 98*a* from sliding back into its extended P-C 93*a* configuration shown in FIG. 14.

This sliding embodiment of the invention can be hung onto a wall as shown in FIG. 7 however without a swingarm; its other "support stand" functions are disabled. Sliding U-shaped abdomen spacer 98*a* in and out of P-C 93 is however somewhat easier to actuate than rotating a swingarm when reconfiguring the P-C between its FIG. 1 usage mode and its FIG. 2 usage mode. This sliding, purpose-built embodiment of the invention is therefore more appropriate for use in wearable P-C application scenarios in which the user does not require occasional desktop deployment (for example: truck drivers making deliveries or hospital staff making patient rounds).

FIGS. 15 and 15A illustrate various construction details of a preferred embodiment of PC carrier 300. This exploded view clarifies minor changes to the various parts and assemblies that were described above and which render this embodiment somewhat easier and cheaper to manufacture than the functionally identical embodiment shown in FIG. 5.

Carrier 300 grips frictionally onto the lower surface of PC 301 by means of right and left friction pads 307 and 308, said pads typically being formed of soft silicone material. Pads 307 and 308 are squeezed against PC 301 by rectangular backplate 302 which is clamped to PC 301 by fixation to right mount-block 303 and left mount-block 304, said mount-blocks gripping onto the top surface of PC 301 by means of right and left gripping flanges 317 and 318. Backplate 302 includes corner holes 309, 311,313 and 315, thereby enabling screws 310, 312, 314 and 316 to secure said backplate to the bottom surface of said mount-blocks by means of corresponding pairs of threaded holes (not visible) formed into bottom of said mount-blocks. The height of mount-blocks 303 and 304 is such that when affixed to backplate 302, the clamp assembly frictionally engages onto the upper and lower surfaces of PC 301 to form the anchor structure used for mounting swingarm assembly 305.

Right and left mount-blocks 303, 304 each include an outer flange 319, 320 that forms the upper surface of the left and right horizontal keyways used to lock swingarm 321 into the wearing and desktop stand modes described above with reference to FIG. 5. The lower surfaces of said right and left keyways are formed by the upper surface of backplate 302 at its left and right extremities, thereby completing the horizontal keyways needed to engage lock keys 322 and 323 of swingarm assembly 305. To form the right and left vertical keyways needed to lock swingarm 321 into its desktop stand modes, said mount-blocks include vertical notches 324 and 325 and backplate 302 includes matching vertical notches 326 and 327.

Comparing the carrier configuration of FIG. 15 to the carrier configuration of FIG. 5, it is evident that assembling mount-blocks 303, 304 onto backplate 302 to grip PC 301 is functionally identical assembling gripping plates 82 onto pivot-bosses 76 to grip PC 1. Both of these wearable PC carrier assemblies utilize the same cruciform keyway configuration to selectably lock a U-shaped swingarm into its various usage modes. It is also evident when comparing FIG. 5 and FIG. 15, that all three carriers are embodiments of the same inventive concept: whereby a neckstrap and configurable swingarm assembly grip a Pad Computer such that in one configuration said PC may be operated while being worn and in another configuration said PC may be propped conveniently onto a desktop.

Referring back to FIG. 15, once the backplate and mount-blocks assembled onto PC 301, the cruciform keyways formed by the structure are symmetrical about threaded hinge-pin holes 328 and 329 through right and left mount-blocks 303, 304. Said hinge-pin holes receive the threaded end of hinge-pins 330 and 331, to form the pivot for rotation of swingarm assembly 305. Said hinge-pins each include a cap portion 332 (for arresting the travel of the axial travel swingarm lock-keys as described below), a bearing portion 333 (to support rotation of said lock-keys as described below) and a threaded portion 334 (for fixation of each pin into its respective mount-block hole 328 and 329).

Swingarm assembly 305 is comprised of U-shaped swingarm 321, which is generally shaped as described earlier above. In FIG. 15s exploded view, said swingarm's inwardly-biased right and left side-arms 335 and 336 are shown held parallel for engagement onto, their respective mount-blocks however when released they will naturally incline inwards (as shown in FIG. 11A). The inward biasing of said side arms provides the spring force needed to automatically seat right and left lock-keys 322 and 323 into the assembled left and right cruciform keyways described above. For efficient manufacture, the swingarm assembly is typically formed from a bent strip of aluminum to form a U-shaped swingarm 321 to which discrete lock-keys 322, 323 are affixed. The abdominal contact portion of said swingarm is typically coated with a high friction material to improve operational stability when worn. Monolithic swingarms machined from metal or formed by plastic injection molding are also suitable manufacturing techniques (not illustrated).

Referring also to FIG. 15's "Detail C"—FIG. 15A inset for clarity, each sidearm 335, 336 of U-shaped swingarm 321 has two spaced-apart holes 341, 342 for affixing right and left lock-keys 322, 323 at their preferred location for balanced load carrying as described above with reference to FIG. 5. Said lock-keys are formed for engagement into either the horizontal or vertical channels of the cruciform keyways described above. Each lock-key includes threaded fixation means proximate to each end which may be comprised of nuts 340 which engage bolts 339 through swingarm fixation holes 341, 342 and lock-key fixation holes 351, 352. If said lock-keys are made of injection molded plastic then threaded inserts may be used instead of the illustrated nuts 340. This bolt-on lock-key configuration is more easily manufactured than the earlier press-fit swingarm construction shown in FIG. 5.

Each sidearm 335, 336 includes a pivot-pin access hole 337 pierced midway between its key-fixation holes 341, 342. The diameter of said access hole is large enough to permit the head portion 332 of pivot-pins 330, 331 to pass through freely. Each lock-key 322, 323 also includes a pivot-pin bearing hole 338 through which pivot-pins 330, 331 are passed during assembly of carrier 300. Pivot-pin bearing hole 338 has a small diameter portion (shown in Detail C) and a large diameter portion (also numbered 338 on left lock-key 323). Pivot-pin bearing hole 338 is also shown in hidden lines in FIGS. 18 and 19. Said small-diameter portion of hole 338 is for rotatably supporting the bearing portion 333 of said pivot-pins and said large diameter portion is counter bored to a depth that permits the large diameter head portions 332 of said pivot pins to arrest the travel of said lock-keys as inwardly biased sidearms 335, 336 are pulled apart by the user to unlock swingarm 321 for rotation. To re-lock said swingarm at any of its four orientations, the user simply relaxes tension to allow the inward biasing of said sidearms to propel said lock-keys into either orthogonal channel of said left and right cruciform keyways.

Sidearms 335, 336 each have a neckstrap attachment hole 343, 344 located proximate its front end. In its preferred embodiment, neckstrap assembly 306 is comprised of left and right neckstrap cords 345, 346, each cord being attached at one end to the its respective sidearm through attachment holes 343, 344 and at its opposite at to right and left cord length adjustment clamps 345, 346 (left clamp not visible). As described above with reference to FIG. 5: by unclamping said adjusters, said left and right cords can adjust the effective neckstrap length to suit user needs. Cords 345, 346 are typically nylon "parachute" cords that are first passed through their respective close-fitting fixation holes and then melted to form domes 347 which when solidified prevent said cord ends from being withdrawn. Other, more conventional styles if neckstrap may also be used to wear carrier 300. The overlapping neckstrap cord portions 345, 346 ride on the back of the user's neck and typically pass through a soft sleeve 350 to improve comfort and facilitate smooth operation as the cords slide though to adjust overall length. Neckstrap sleeve 350 may include separate internal cord channels to prevent cords 345, 346 from rubbing against each other and also to spread the load more evenly onto the user's neck.

Figure 16:
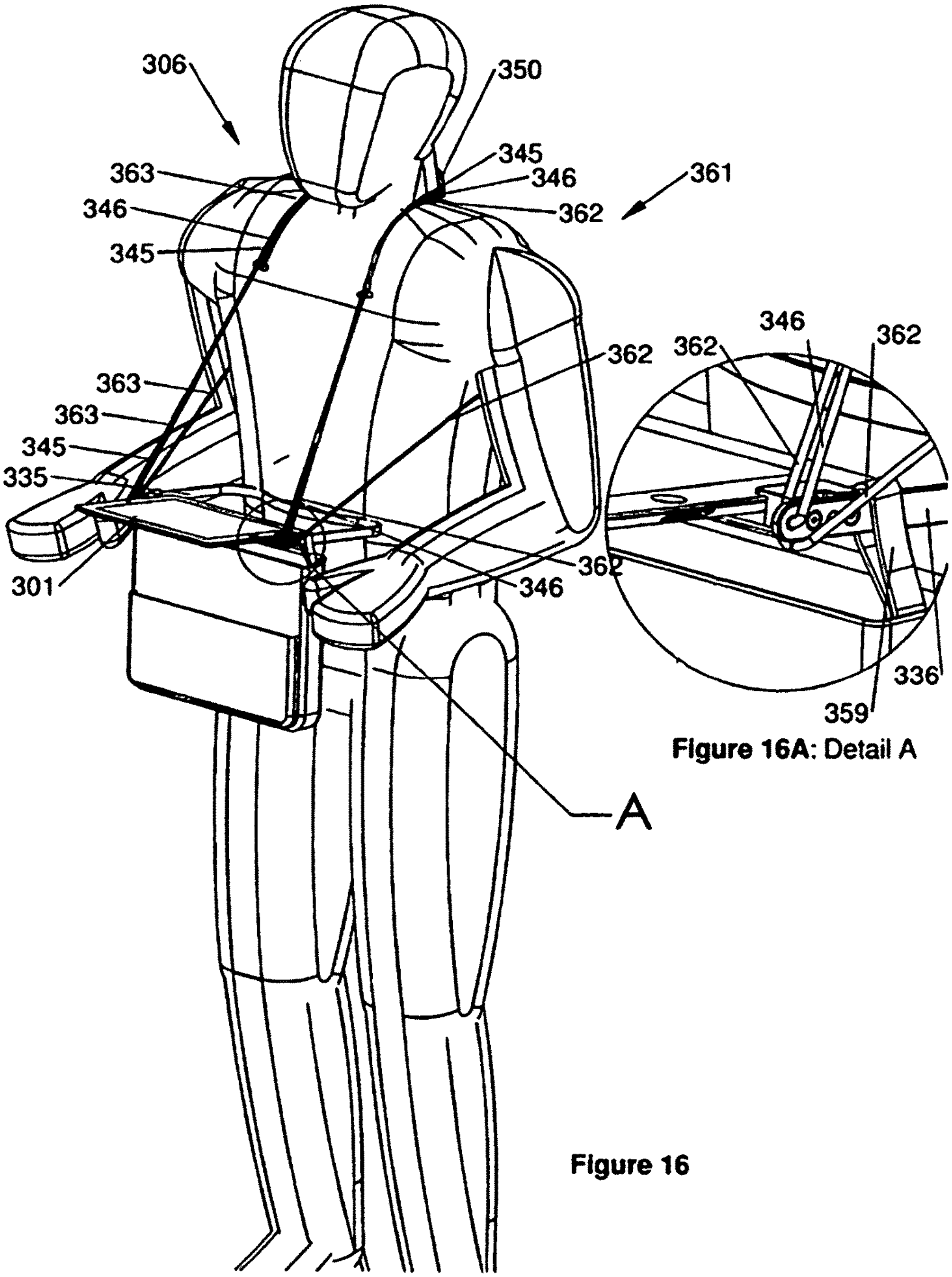
FIG. 16 illustrates the use of an auxiliary shoulder harness which transfers the weight from the user's neck onto their shoulders.

FIG. 16 illustrates the use of an auxiliary shoulder harness which transfers weight from the user's neck onto their shoulders for improved comfort during extended use. Shoulder harness 361 is a length of cord similar to that used to form neckstrap 306, said cord being formed to comprise left shoulder loop 362 and a right shoulder loop 363, each joined together at one point to form a substantially "FIG. 8 shape".

FIG. 16A—Detail A illustrates how left loop 362 has been hooked over the front end of left sidearm 336 (right loop 363 is similarly hooked over the front end of right sidearm 335) thereby transferring the weight previously borne by neckstrap 306 and cords 345, 346 onto shoulder harness 361 and the user's torso. To insure proper weight transfer, the size of loop 362 and loop 363 are adjusted small enough that their loaded triangular shape fully supports the weight and causes neckstrap cords 345, 346 to hang slightly loose (said unloaded neckstrap cords form a slight catenary not visible in the drawings).

Figure 17:
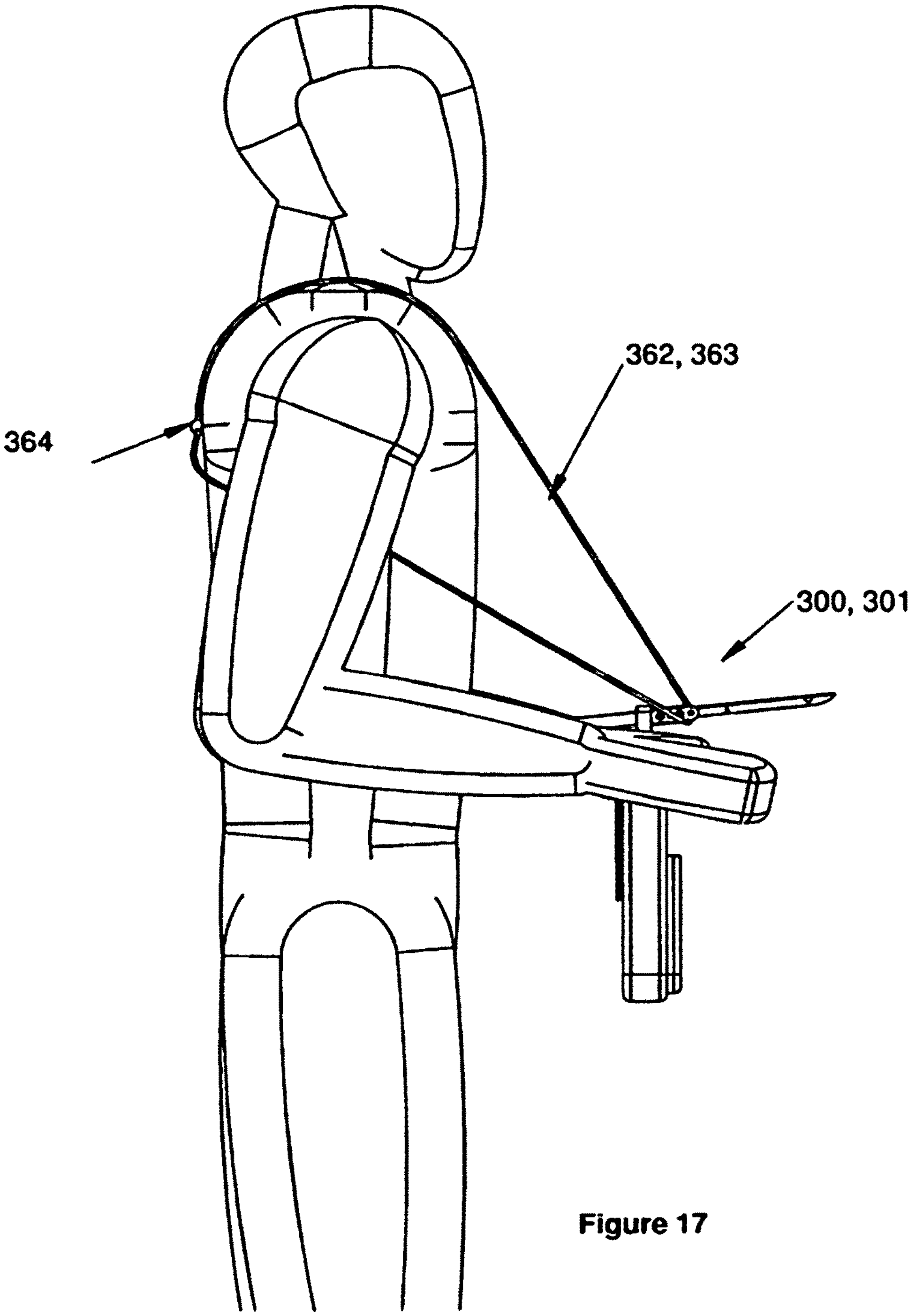
FIG. 17 illustrates a side view of the shoulder harness of FIG. 16 when being worn.
Figure 18:
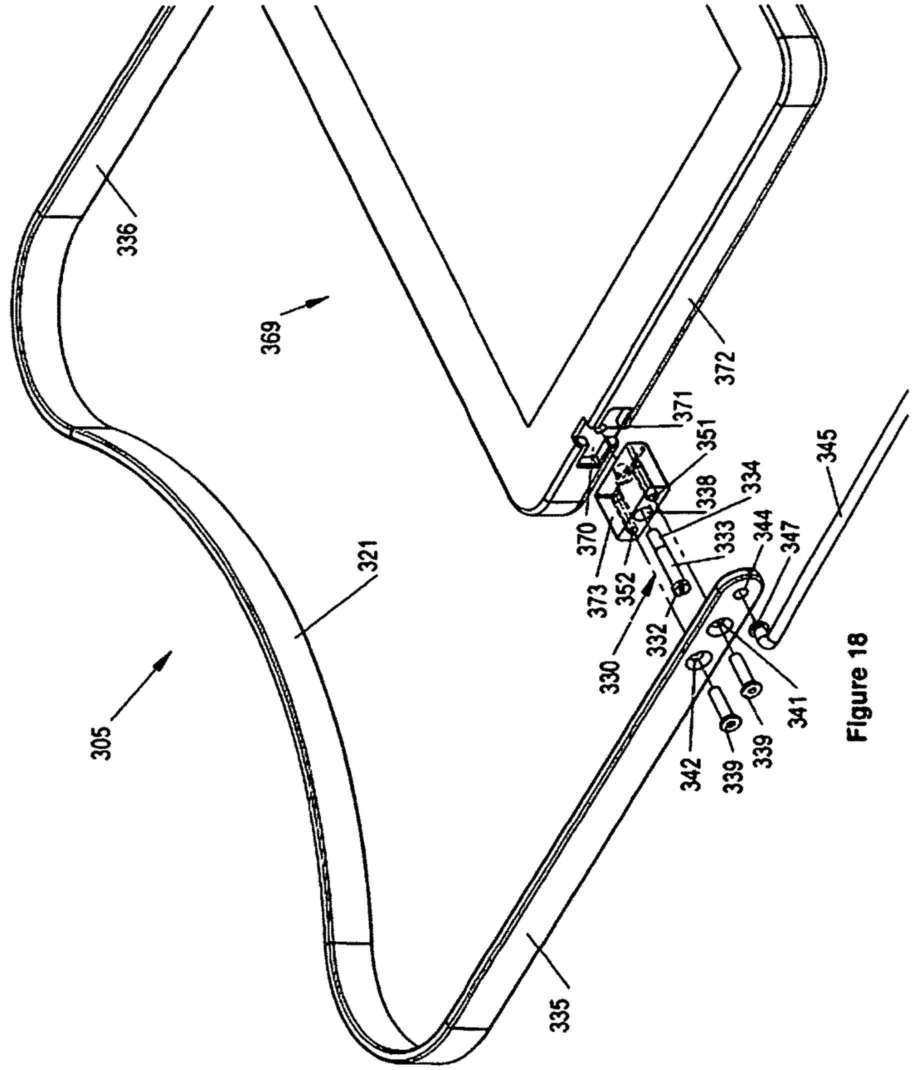
FIG. 18 illustrates an exploded view of an OEM embodiment similar to that shown in FIG. 11 wherein the swingarm pivot-pin is threaded into the PC's case.

FIG. 17 illustrates a side view of the shoulder harness of FIG. 16 when being worn. FIG. 18 is an exploded view of another OEM or "integrated" embodiment of the invention similar to the embodiment shown in FIG. 11. In both embodiments, instead of utilizing a cruciform keyway that is clamped onto an existing PC as shown in FIG. 15, said keyway is integrated directly into housing 372 of specially constructed PC 369, thereby providing a simpler and more visually appealing apparatus. PC 369 includes PC housing 372, said housing having left and right, coaxial pivot-pin fixation holes 371, each pivot-pin fixation hole being symmetrically centered in the bottom of left and right cruciform keyways 370 which are recessed into the left and right sides of said housing. Said pivot-pin fixation holes receive the threaded portion 334 of pivot-pin 330, thereby providing the pivoting and locking means necessary to mount and operate swingarm assembly 305.

Swingarm assembly 305 is comprised and configured substantially as described above with reference to FIG. 15. However; the absence of clamped-on mount-blocks protruding from the sides of the PC Said swingarm mounts to would force its sidearms 335, 336 to swing too close to the edge of housing 372 for the user to grasp said sidearms for operating the swingarm mechanism as described above. Therefore, to provide adequate finger-clearance for the PC to be rapidly opened and closed as described above, the OEM embodiment of FIG. 18 provides extended lock-key 373, said lock-key having a sufficient depth to both engage into cruciform keyway 370 and to also space its attached sidearms 335, 336 away from the edge of case 372 by approximately ½" for finger clearance during operation of the swingarm mechanism.

OEM lock-key 373 is an extended version of the shorter-depth lock-key 322 used in the clamp-on embodiment shown in FIG. 15. Central lock-key hole 338 includes both a narrow diameter portion (for supporting the bearing portion 333 of pivot-pin 330) and a wider diameter portion (which enables said pivot-pin's head portion 332 to travel inside said lock-key as described above for FIG. 15). Lock-key 373 includes threaded fixation holes 354352 for affixing said key to sidearm 335 using bolts 339 fitted through fixation holes 341,342. The depth of OEM lock-key 373 is sufficiently deep to contain the entire counter-bored portion of hole 338 therefore the sidearm access hole 337 shown in FIG. 15 is not required.

Mounting the swingarm assembly is accomplished by first securing key 373 to PC housing 372 by screwing pin 330 into hole 371, after which sidearm 335 is secured to said key using bolts 339. Left sidearm 336 is similarly assembled to the left side of case 372 (not visible). As in FIG. 15, neckstrap cords 345, 346 are secured through hole 34, 344 located near the front end of sidearms 335, 336.

OEM PC 369 and its detachable swingarm assembly 305 are independently saleable products. A user can first purchase a PC configured with strategically positioned side fixation holes for mounting swingarm as described above and then use it as they would a conventional, handheld PC. Their PC may subsequently be upgraded with a swingarm 305 to provide wearability and desktop stand functions. To provide a more conventional appearance when used as a conventional, non-wearable PC, suitably formed decorative plugs (not shown) may be included and inserted to conceal left and right keyways 370 and swingarm fixation holes 371.

Figure 19:
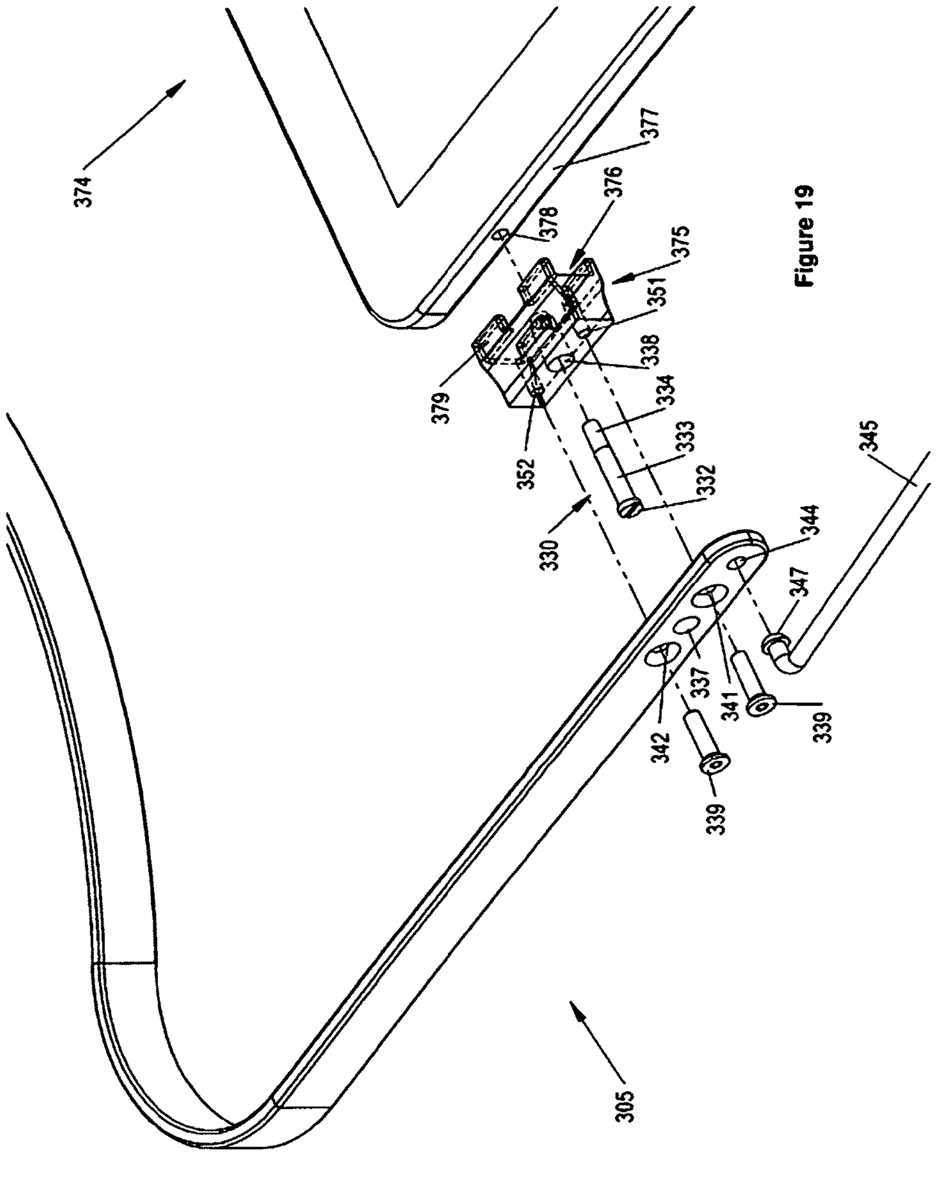
FIG. 19 illustrates an exploded view of an OEM embodiment integrated to a thinner Pad Computer than shown in FIG. 18.

FIG. 19 illustrates another OEM embodiment, similar to those shown in FIG. 11 and FIG. 18 but better adapted for use with very thin PCs. As PC technology advances, the thickness of case 372 may become too small to enable a sufficiently robust cruciform keyway 370 to be recessed into its left and right sides. Esthetic reasons also demand that the OEM housing's built-in swingarm mount be less visible than the large keyway shown in FIG. 18. Therefore, PC 374 is configured with housing 377 having a thin rectangular edge profile suitable for acting as a lock-key when inserted into a suitably formed keyway. Said PC housing includes left and right fixation holes 378 (left hole not visible) said holes being coaxial and located with respect to the PC's center of gravity such that their shared axis can pivot swingarm 305 into its various balanced and unbalanced usage modes as described above. Said left and right fixation holes 378 are typically threaded to receive a threaded fixation portion 334 of pivot-pin 330 however "bayonet mount" fixations may be used to increase the ease with which swingarm 305 can be mounted or dismounted from PC 374. A decorative plug (not illustrated) may be inserted into holes 378 to provide better appearance when its optional swingarm and neckstrap assembly has not been fitted to PC housing 377.

Swingarm assembly 305 includes left and right bolt-on keyway blocks 375 (left block not visible). Each keyway block 375 includes cruciform recess 376 having horizontal and vertical channels formed for locking engagement onto the edge of thin PC case 377. Each keyway block 375 includes threaded fixations holes 351, 352 for affixing said block to sidearms 335, 336 using bolts 339 fitted through fixation holes 341,342. Said keyway block includes central hole 338 which has both a narrow-diameter portion (for supporting the bearing portion 333 of pivot-pin 330) and a wider-diameter portion (which enables said pivot-pin's head portion 332 to move axially and stop the outward travel of said block as the user pulls outward against biased sidearm 335's inward pressure to release said swingarm for rotation). Access hole 337 enables easy installation or removal of pivot-pin 330 using a screwdriver or Allen key. By permitting the head 332 of said pivot-pin to protrude through its sidearm access hole 337 also effectively lengthens the axial stroke of pivot-pin 330 with respect to its keyway block 375; thereby insuring adequate range of motion to fully disengage cruciform keyway 376 from the edge of PC 377 before its motion is arrested by head 332 seating onto the bottom of the large-diameter portion of hole 338.

Figure 20:
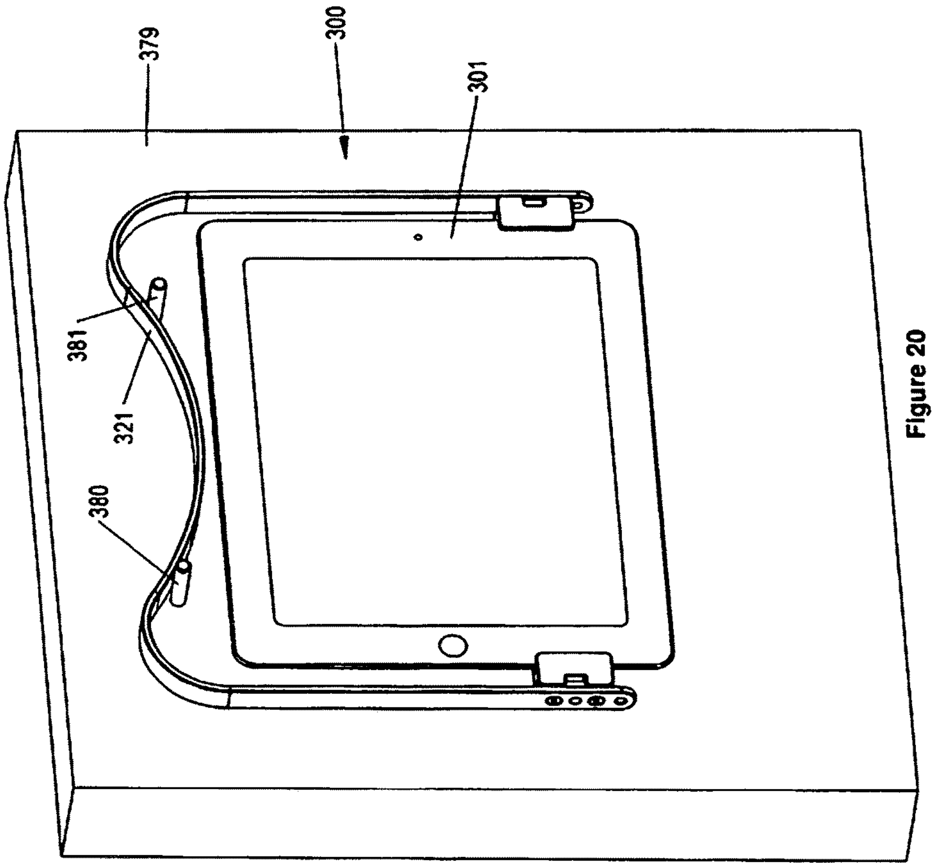
FIG. 20 illustrates the carrier hung onto a wall in landscape orientation.

FIG. 20 illustrates the carrier hung onto a wall in landscape orientation.

Figure 21:
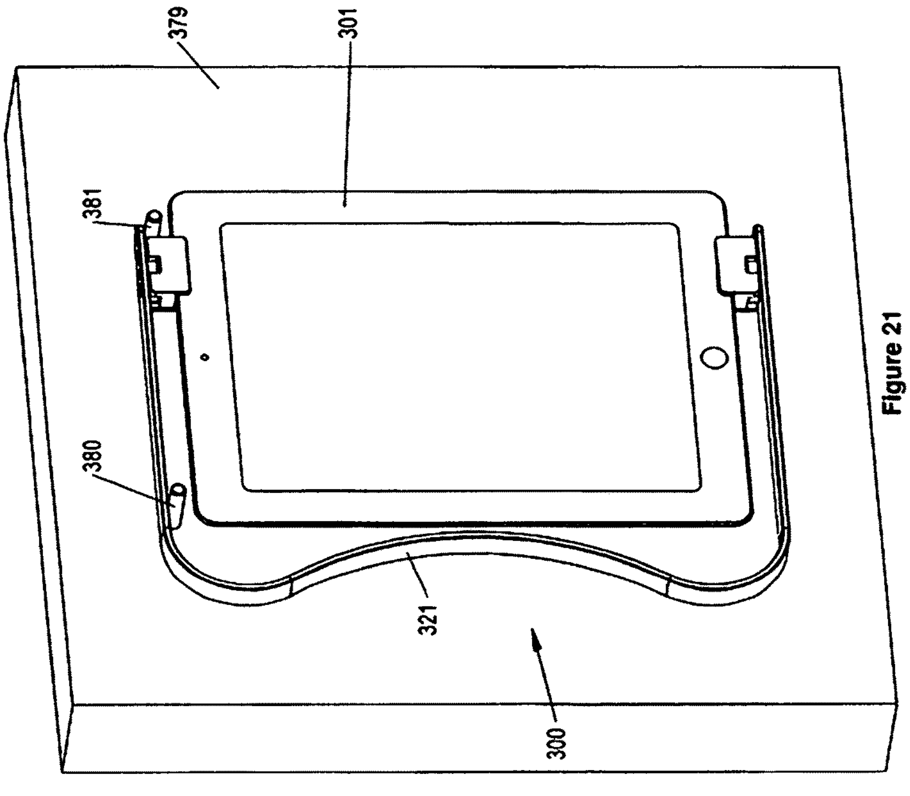
FIG. 21 illustrates the carrier hung onto a wall in portrait orientation.

FIG. 21 illustrates the carrier hung onto a wall in portrait orientation.

Figure 22A:
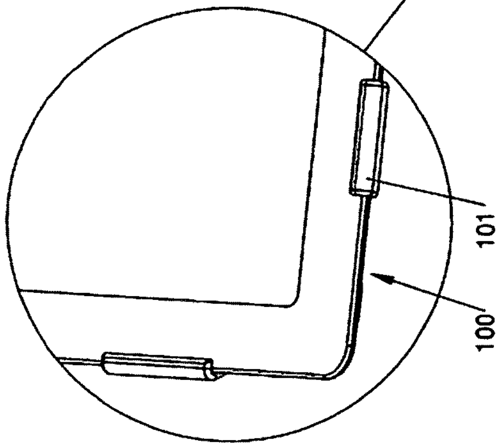
FIG. 22A is a detail view in FIG. 22.

FIG. 22 illustrates the use of a wrap-around baseplate that grips onto the P-C instead of using an adhesive film or side clamps to secure the carrier baseplate to the P-C. Backplate 100 is typically formed of semi-rigid plastic which includes a plurality of claws 101 around its perimeter that can be deformed to snap over the front surface of P-C 1 and thereby join itself to carrier 2 (as illustrated in detail FIG. 22A).

A similar and even more intrusively visible attachment means of mounting swingarm 4 and neckstrap 5 to P-C 1 (not illustrated) is to slide the entire P-C into a case that covers all sides of said P-C, said case having apertures as needed that enable the user access the P-C's touch screen and data ports. This outer case is functionally equivalent to backplate 100 in FIG. 22 and mounts equivalent pivot bosses underneath P-C 1 to receive swingarm assembly 4 and neckstrap assembly 5.

Figure 23:
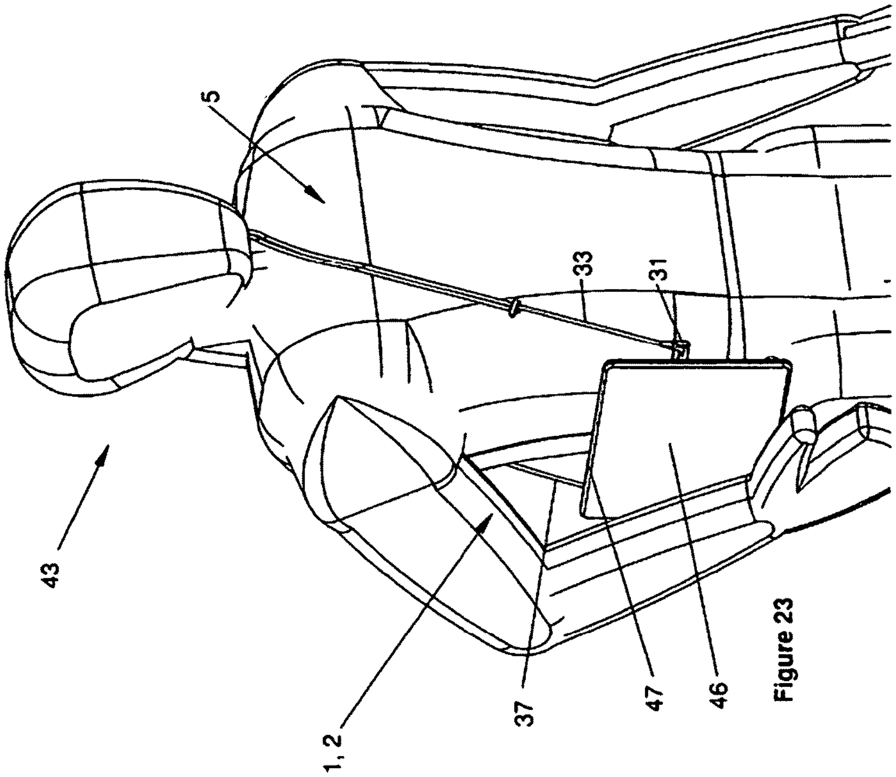
FIG. 23 illustrates the P-C carrier configuration with an optional accessory storage bag affixed over the P-C's touch screen

FIG. 23 illustrates the P-C carrier with optional accessory storage bag 46 affixed over the P-C's touch screen (see FIG. 24 for fixation details). Typically, bag 46 is sewn from stretchable neoprene foam material which, when affixed to the P-C as shown will help protect its touch screen from shock damage during transport. Bag 46 has a zippered upper aperture 47, thereby enabling user 46 to carry sundry items such as the carrying strap 5 or a folding wireless keyboard for use when deployed on a tabletop.

Bag 46 may have the same dimensions as its underlying P-C (in this illustration its underlying P-C is approximately 7.5" tall×9.5" wide). Bag 46 may also be configured with a lower bag extension to increase the size of objects it can accommodate. For example if bag 46 is made 12" tall×9.5" wide then letter-sized documents can be carried about to increase the invention's overall utility as a mobile office. This extended bag (not illustrated) is also capable of carrying other peripherals such as the Apple Wireless Keyboard™.

FIG. 24 illustrates a convenient means for affixing the accessory bag 46 shown in FIG. 23 onto the exposed side of P-C 1. Bag 46 includes four corner pockets 54*a*, 54*b*, 54*c* and 54*d* that are formed of stretchable neoprene fabric which enables the user to deform them over the four corners of P-C 1, thereby affixing said bag as illustrated in FIG. 23. If a larger bag is desired in order to carry items larger than the face dimensions of P-C 1 then a bag portion is provided that extends past lower fixation pockets 54*c* and 54*d* (not illustrated). In FIG. 24 button 57 is a rubber cushion for when the assembly is placed on a table.

In FIG. 24 adjustable neckstrap assembly 5 is comprised of left swivel-pin 32, left L-shaped swivel 31, left neckstrap cord 33, left cord-length adjuster 38*a* (FIG. 5), neck-cushion 45, right cord-length adjuster (see 38*b* in FIG. 5), right neckstrap cord 37, right L-shaped swivel 35 and right swivel-pin 36. Left and right swivel-pins 32 and 36 are selectively engaged into left and right swivel-pin bores 17 and 19 on baseplate 3, thereby enabling a user to wear the suspended Pad Computer as shown in FIG. 22. The two connections between the neckstrap cords and the carrier's baseplate or backing plate are referred to as "coupling points". Bores 17 and 19 are coaxial and parallel to rotational axis 11. Bosses 16 and 18 are positioned with respect to the user and to the rotational axis 11 such that good balance and usability of P-C 1 is achieved in various wearing modes (see FIG. 22 and FIG. 23).

Also shown in FIG. 24 is a positive-locking means for retaining neckstrap swivel-pins 32 and 36 within their respective swivel bores 17 and 19 (instead of relying on the friction of a slight interference fit between each swivel pin and its pivot bore). L-shaped swivels 31 and 35, (shown stored by being folded within neckstrap cushion 45 against base 3 beneath arm 20 in FIG. 24—see below), can have an annular locking groove 55*a* and 55*b* near their respective swivel-pins that is formed for engagement with locking levers 56*a* and 56*b* on swivel bosses 16 and 18. When the user wishes to detach neckstrap 5 from baseplate 3, said levers must be manually deformed far enough that they disengage from their respective locking grooves 55*a* and 55*b*. Other positive locking means will be obvious to those practiced in the art. For example: pins 32 and 36 may extend far enough past their respective bores 17 and 19 that a user-actuated expansion-spring on each tip prevents the pin's inadvertent extraction (not illustrated).

FIG. 24 also shows a means for storing neckstrap or "body support member" 5 in a compact manner that hides it from view when swingarm aperture 23 is hung onto a wall. Neckstrap cushion 45 is comprised of a fabric sleeve that can be opened along its length by means of Velcro™ closure strips. Neckstrap cushion (and sleeve) 45 can thereby be used to contain left and right neckstrap cord portions 33 and 37 and their attendant length adjusters 38A and 38B (FIG. 5), once all of them have been coiled together into a short enough bunch that the sleeved neckstrap assembly can be stored against the back of P-C 1 when swingarm 20 is folded and locked against it as shown. To further secure the stored neckstrap 5, swivel-pins 32 and 36 may be inserted into either end of their respective swivel-bores 16 and 19 (not illustrated as such). Swivels 31 and 35 can be stored either facing outward (for quick re-deployment as a neckstrap) or facing inward (for invisibility when P-C 1 is stored onto a wall as shown in FIG. 20).

Figure 25:
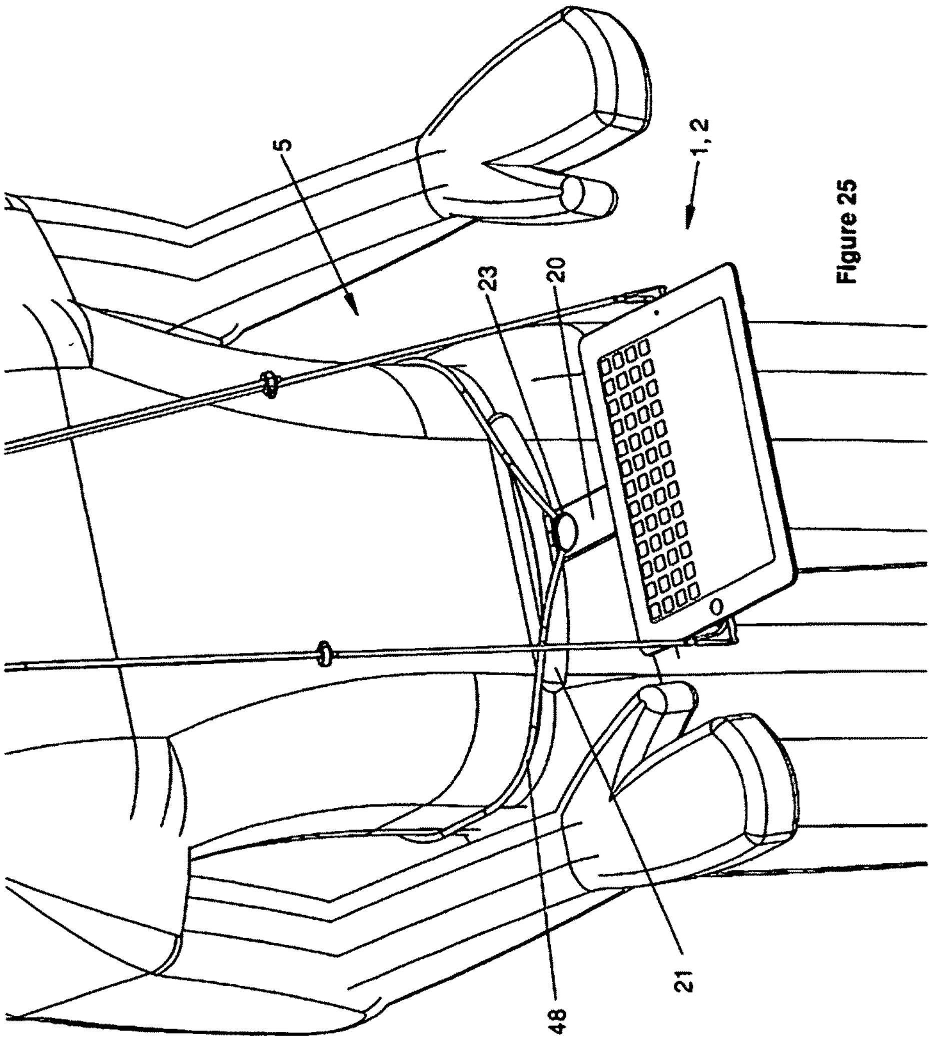
FIG. 25 illustrates the carrier configuration of FIG. 24 with an optional waist strap securing the body-contact bar for more secure fit to the user during exercise.

FIG. 25 illustrates the carrier configuration with an optional waist back-strap 48 securing body-contact bar 21 against the user's abdomen for a more secure fit during rapid motion. Strap 48 is an elastic "bungee cord" having end hooks which serve as connectors that enable the user to wrap said strap around their back and secure both its ends into aperture 23 of swingarm 20. Strap 48 can also be used in this manner to better secure the P-C flat against the user's abdomen when the carrier's swingarm is folded. When not in use, optional waist back-strap 48, or "waist strap" may be stored in the accessory bag 46 described above.

While the "coupling points" are shown as attached to a backplate it is also possible to provide an embodiment of the carrier in which the hinge pivot boss and neckstrap swivel pivot bosses are molded integrally into the Pad-Computer's main housing. Other Figures illustrate embodiments of the invention that are retro-fitted onto existing Pad-Computers. If however the P-C is specifically designed and manufactured for optimal integration of the present invention into its core structure then improved functionality and appearance will be obtained. The swivel bosses 16, 19 can be molded integral into the bottom of the computer case, thereby providing a stronger and more efficient support structure.

In the above drawing description of parallel parts such as, for example parts identified by 84a, 84b, may on occasion be referred to by their common number, eg: 84.

CONCLUSION

The foregoing has constituted a description of specific embodiments showing how the invention may be applied and put into use. These embodiments are only exemplary. The invention in its broadest, and more specific aspects, is further described and defined in the claims which now follow.

These claims, and the language used therein, are to be understood in terms of the variants of the invention which have been described. They are not to be restricted to such variants, but are to be read as covering the full scope of the invention as is implicit within the invention and the disclosure that has been provided herein.

It is appreciated that certain features of the invention, which are, for clarity, described in the context of separate embodiments, may also be provided in combination in a single embodiment. Conversely, various features of the invention that are, for brevity, described in the context of a single embodiment, may also be provided separately or in any suitable subcombination.

The invention claimed is:

1. A support for attachment to a portable computer having lateral sides and an underside surface to be used by a user comprising:

a) a body support member by which the weight of the computer support and computer may be carried by the upper body of the user, and b) a body propping member for positioning the computer outwardly from the torso of the user, the propping member including two movable arms with pivotal connections for connecting the arms within the support and outer deployable arm-ends that are joined by a bridge to form a U-shaped propping member, wherein:

1) such arms are rotatably deployable about the pivotal connections from storage positions that will orient the arms to lie along the lateral sides and adjacent to the underside surface of the computer to an operating position whereat the respective deployable ends of the arms are positioned for being supported by the torso of said user, at least one of such arms being disengageably fixable at, respectively, the stored and deployed positions to allow locking of the U-shaped propping member in place, 2) the body support member is in the form of two or more strap portions that are configured to be connected at coupling points to the computer support or computer for carrying the weight of the support and computer, and 3) the body support member comprises adjustable fasteners to permit the user to raise or lower the vertical location of the computer when carried by the user.

2. A support as in claim 1 wherein the coupling points are respectively positioned along the arms at a location with respect to the pivotal connection that is either at the pivotal connection or is on a stub extension remote from the outer ends of the arms that are joined by the bridge.

3. A support for attachment to a portable computer having lateral sides and an underside surface to be used by a user comprising:

a) a body support member by which the weight of the support and computer may be carried by the upper body of the user and b) two movable arms with pivotal connections for supporting the computer, the arms having outer deployable arm-ends that are joined by a bridge to form a U-shaped propping member, the pivotal connections bounding a backing plate spanning between the pivotal connections, the backing plate carrying a computer gripping connector for engaging the computer wherein:

1) such arms are rotatably deployable about the pivotal connections from storage positions which will place the arms and the bridge along the sides of the computer to deployed, operating positions with the arms and bridge positioned outwardly from the computer support for positioning against the torso of the user, 2) at least one of such arms being, respectively, disengageably fixable at the storage and deployed positions to allow locking of the U-shaped propping member in place, 3) the pivotal connections allow the respective arms to be rotated to one or more orientations intermediate the storage and deployed positions, to be detachably fixed at the one or more intermediate orientations and thereby allow locking of the U-shaped propping member in place at such orientations, and 4) the arms are resiliently inwardly biased about the bridge for disengageable engagement of the pivot connections.

4. A support as in claim 1, 2 or 3, wherein the pivotal connections are dimensioned to provide a separation gap between the respective arms and the lateral sides of the computer which permits the computer to swing past the fingers of the user holding the arms apart while the pivotal connectors change their orientations.

5. A support as in claim 1 in combination with an elastic waist strap dimensioned to fit around the back of the user at waist level and comprising a propping member connector at least one end of the waist strap for engaging with the body propping member.

6. A support as in claim 1 wherein the pivotal connections allow the respective arms to be rotated about a common axis of rotation to one or more preferred orientations intermediate the storage position and the operating position, to be detachably fixed at such one or more orientations to allow locking of the U-shaped propping member in place and wherein the pivotal connections comprise a key and keyway connector combination and wherein the arms are resiliently inwardly biased about the bridge for engagement of the key and keyway connector combination.

7. A support as in claim 3 wherein the pivotal connections comprise a key and keyway connector combination.

8. A support as in claim 7 wherein the keyway is of cruciform configuration.

9. A support as in claim 6 in combination with the computer wherein the pivotal connections for the body propping member comprise coaxially aligned holes in the respective sides of the computer in combination with respective fasteners that engage with such holes to connect the respective arms to the computer through the pivotable connections, and wherein the respective lateral edges of the computer serve as the key for engaging the keyway.

10. A support as in claim 3, 6 or 7 wherein the arms each have respective propping stub extensions that extend past the location of the pivotal connection for supporting a computer at an elevated orientation when the arms are rotated to at least one of the intermediate orientations.

11. A support as in claim 1 wherein the body support member comprises a neck strap which comprises two pieces of linear material forming strap portions, one first computer-supporting end of each of the respective strap portions being connected at the respective coupling points to support the computer and, with the neck strap being dimensioned to pass around the back of the user, the other second ends terminating at respective compression-actuated sliding and locking end connectors located to be proximate to the chest of the user to provide a sliding, locking engagement between the respective other second ends of the respective straps and an adjacent mid-portion of the opposite strap, thereby providing means for positioning the vertical locations of the two computer-supporting first ends of the strap portions, and further comprising a protective sleeve for covering and permitting the sliding of the strap portions as they pass around the back of the user thereby isolating any sliding action by the strap portions from rubbing against the clothing or body of the user.

12. A support as in claim 1 comprising a backing plate spanning between the two arms and pivotal connectors, the backing plate carrying a computer gripping connector for engaging with the computer.

13. A support as in claim 3 or 12 wherein the computer gripping connector comprises any one of the following: clamps, a bonding membrane, hook and loop fasteners, gripping fingers or a receiving case carried on the backing plate to affix the computer thereon.

14. A support as in claim 1 in combination with a computer having a thickness wherein the width of the arms and bridge measured in the same direction as the thickness of the computer is greater than the thickness of the computer to protect the computer screen from damage.

15. A support as in claim 1 in combination with a storage bag which is fixable over the screen portion of the computer to protect the computer screen from damage.

16. A support as in claim 1 in combination with a computer wherein, when the arms have been rotated into their storage positions the U-shaped propping member extends past the four corners of the computer to provide protection for the computer.

17. A support as in claim 1 in combination with the computer.

18. A support as in claim 2 in combination with the computer.

19. A support as in claim 3 in combination with the computer.

20. A support as in claim 4 in combination with the computer.

* * * * *